(12) United States Patent
Park

(10) Patent No.: US 9,247,039 B2
(45) Date of Patent: Jan. 26, 2016

(54) MOBILE TERMINAL AND CONTROL METHOD FOR THE MOBILE TERMINAL

(71) Applicant: LG ELECTRONICS INC., Seoul (KR)

(72) Inventor: Jongseok Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/252,593

(22) Filed: Apr. 14, 2014

(65) Prior Publication Data

US 2014/0323123 A1 Oct. 30, 2014

Related U.S. Application Data

(60) Provisional application No. 61/817,095, filed on Apr. 29, 2013.

(30) Foreign Application Priority Data

Apr. 30, 2013 (KR) .......................... 10-2013-0048917

(51) Int. Cl.
*H04M 3/00* (2006.01)
*H04M 1/57* (2006.01)
*H04W 4/16* (2009.01)
*H04M 1/64* (2006.01)
*H04M 1/725* (2006.01)

(52) U.S. Cl.
CPC ................. *H04M 1/575* (2013.01); *H04M 1/64* (2013.01); *H04M 1/7253* (2013.01); *H04M 1/72566* (2013.01); *H04M 1/72569* (2013.01); *H04W 4/16* (2013.01)

(58) Field of Classification Search
CPC ..... H04M 1/575; H04M 1/64; H04M 1/7253; H04M 1/72566; H04M 1/72569; H04W 4/16
USPC ................. 455/415, 419, 420, 566, 41.1–41.2
See application file for complete search history.

(56) References Cited

U.S. PATENT DOCUMENTS

| | | | |
|---|---|---|---|
| 8,265,064 B2 * | 9/2012 | DeLorme et al. ............. | 370/352 |
| 2006/0234693 A1 | 10/2006 | Isidore et al. | |
| 2011/0201321 A1 * | 8/2011 | Bonner ......................... | 455/415 |
| 2011/0223933 A1 * | 9/2011 | Sheha et al. ................ | 455/456.1 |
| 2011/0310796 A1 | 12/2011 | Um et al. | |
| 2012/0008756 A1 * | 1/2012 | Arsenault et al. ......... | 379/142.17 |
| 2012/0154265 A1 | 6/2012 | Kim et al. | |
| 2012/0178500 A1 | 7/2012 | Hwang | |

* cited by examiner

*Primary Examiner* — Wayne Cai
(74) *Attorney, Agent, or Firm* — Birch, Stewart, Kolasch & Birch, LLP

(57) ABSTRACT

A mobile terminal including a wireless communication unit configured to receive a call signal from at least one other terminal, in which the call signal corresponds to at least one of a first call ID and a second call ID of the mobile terminal; and a controller configured to receive an event on the mobile terminal after the call signal is received, transmit an event signal to an external terminal wirelessly connected with the mobile terminal using the corresponding first or second call ID to respond to the received event, and control the external terminal to display information on a display unit of the external terminal based on the event signal.

13 Claims, 20 Drawing Sheets

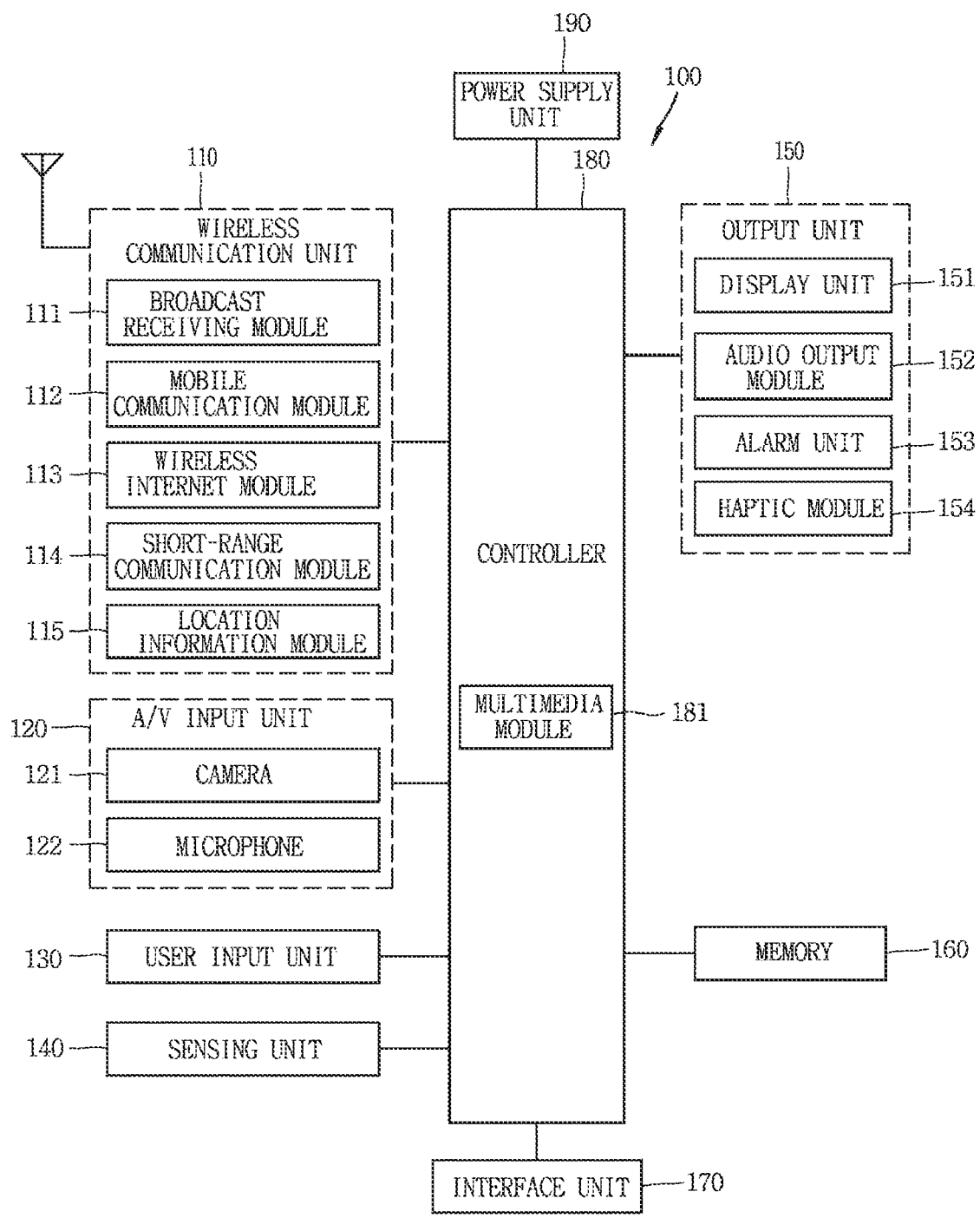

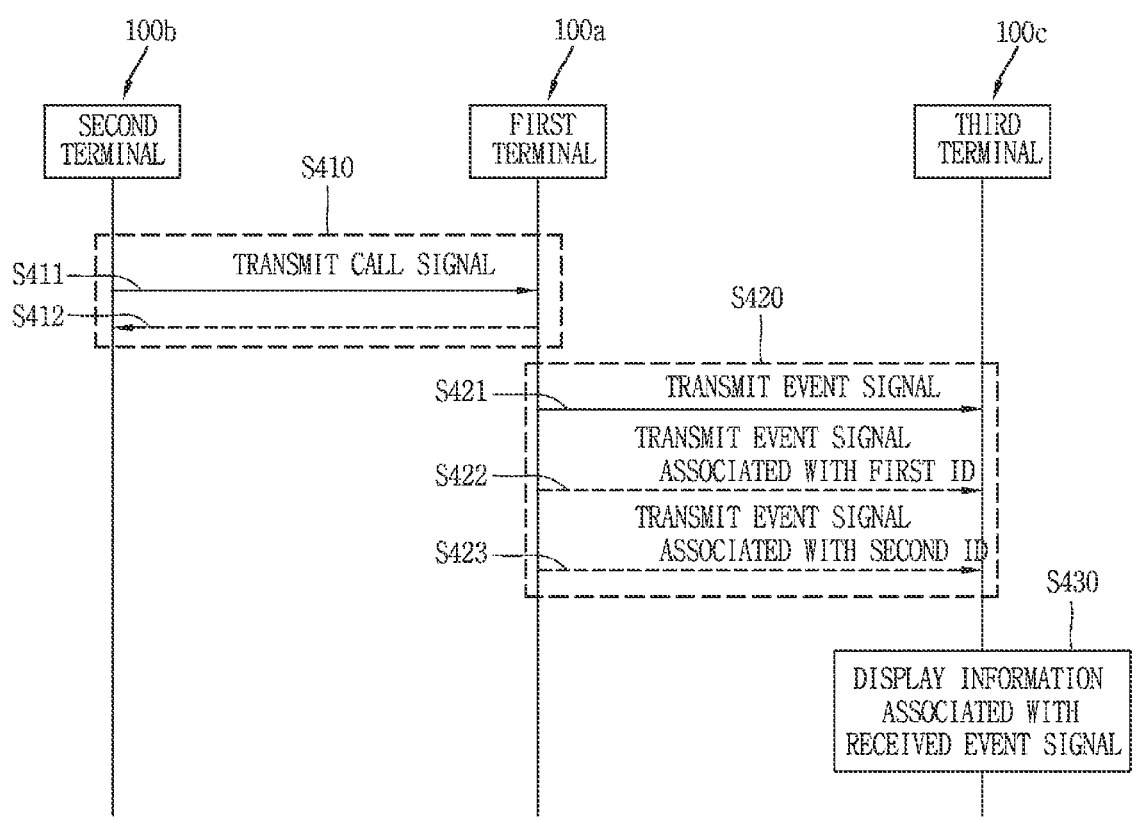

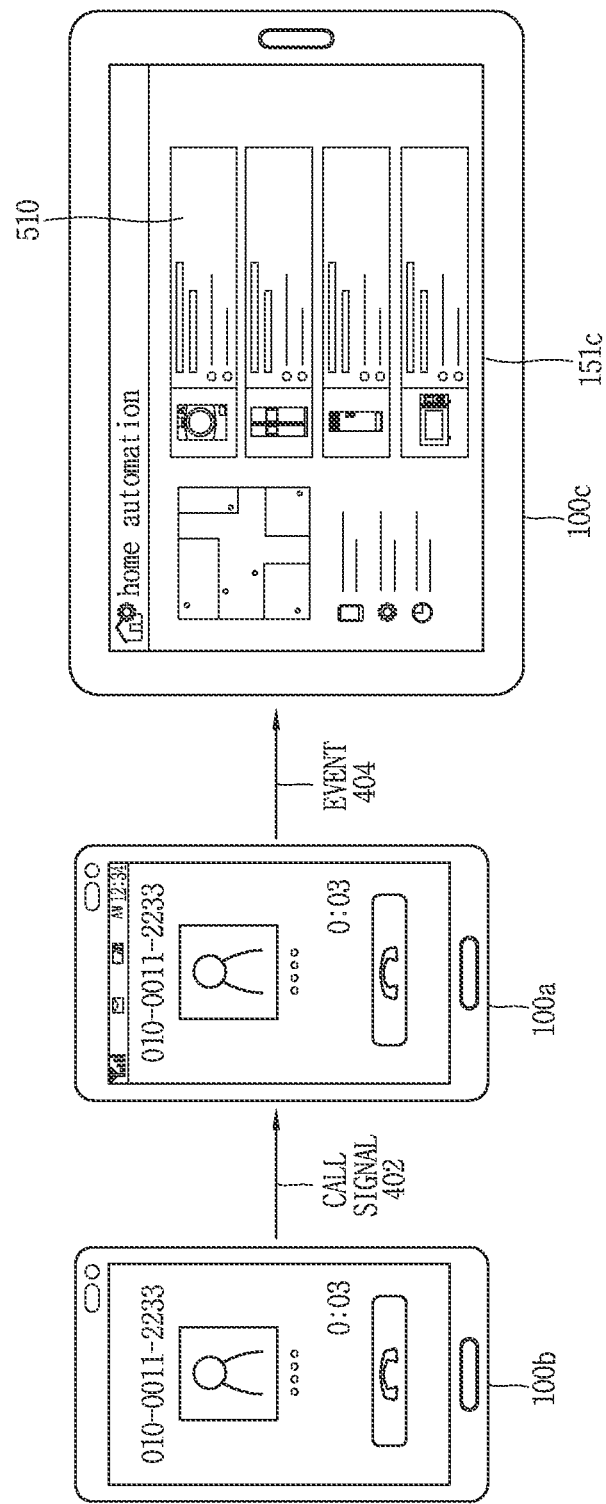

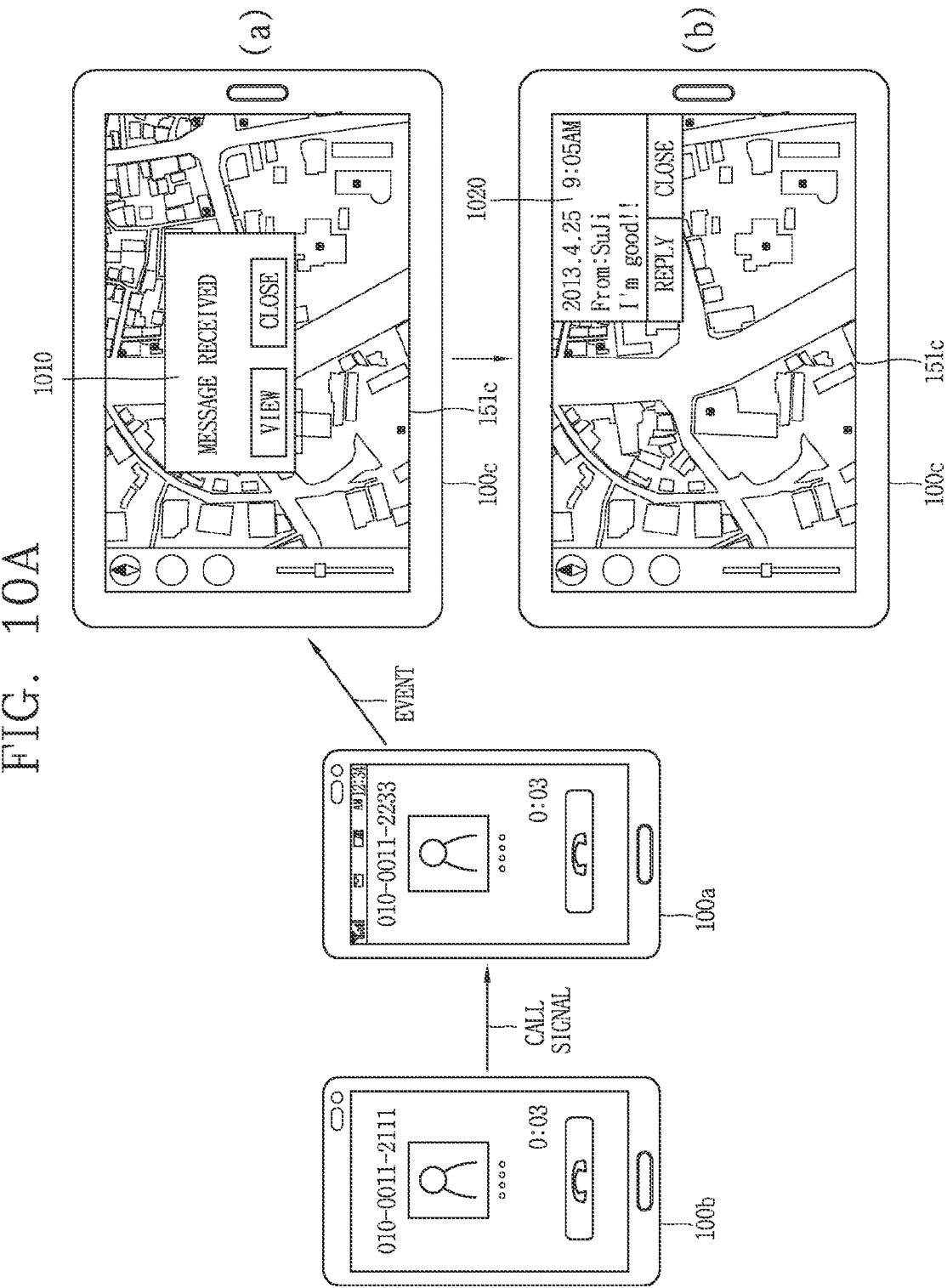

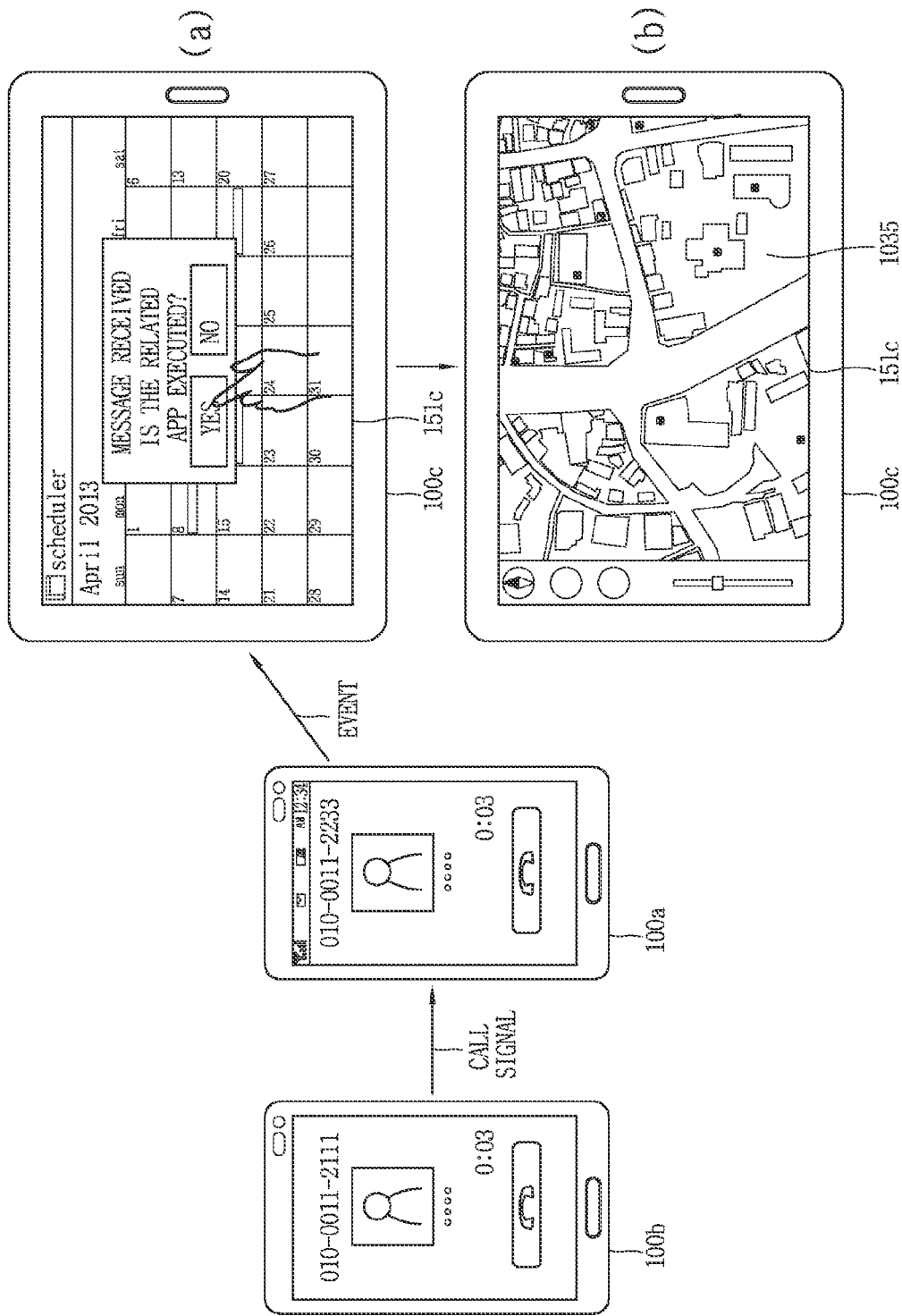

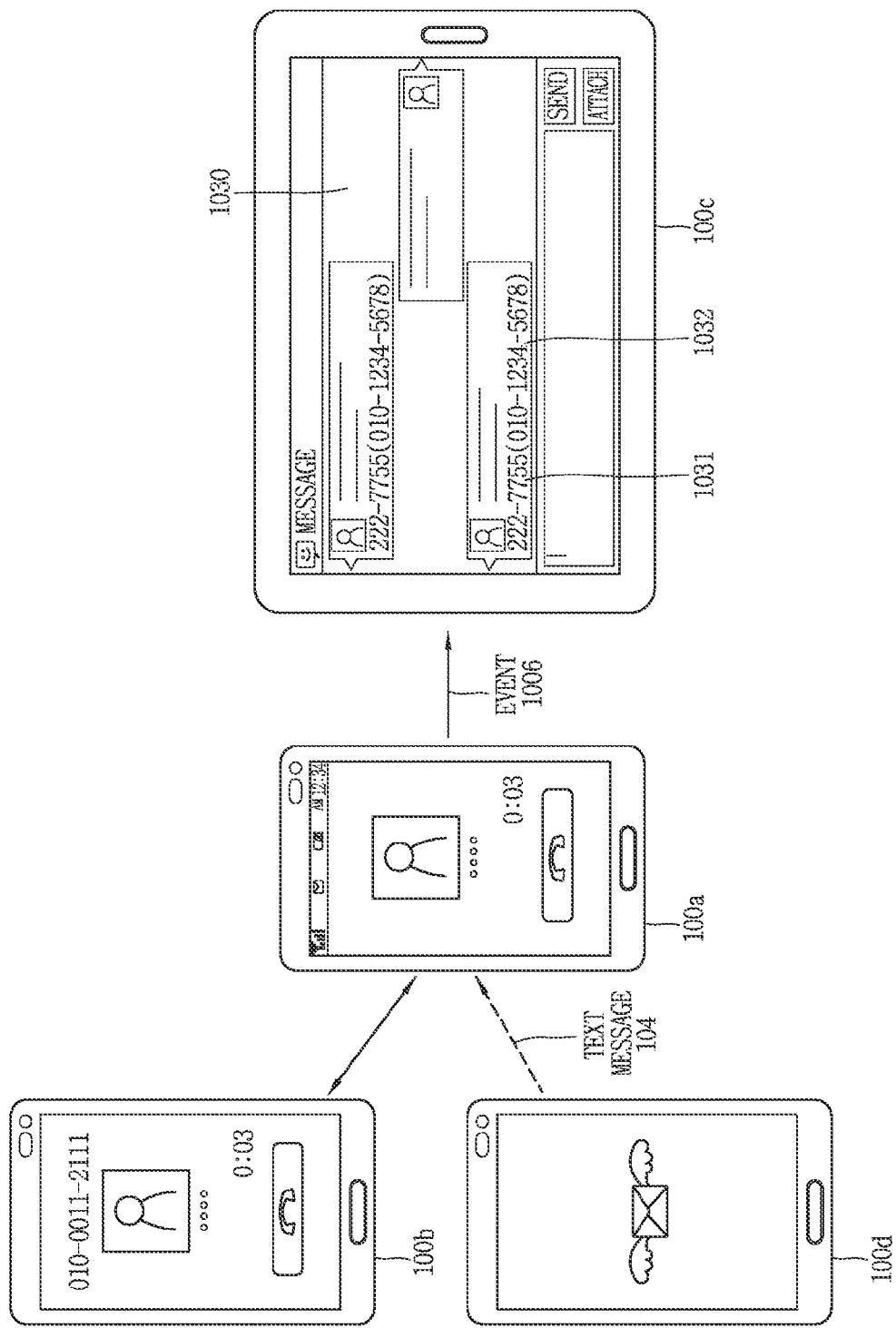

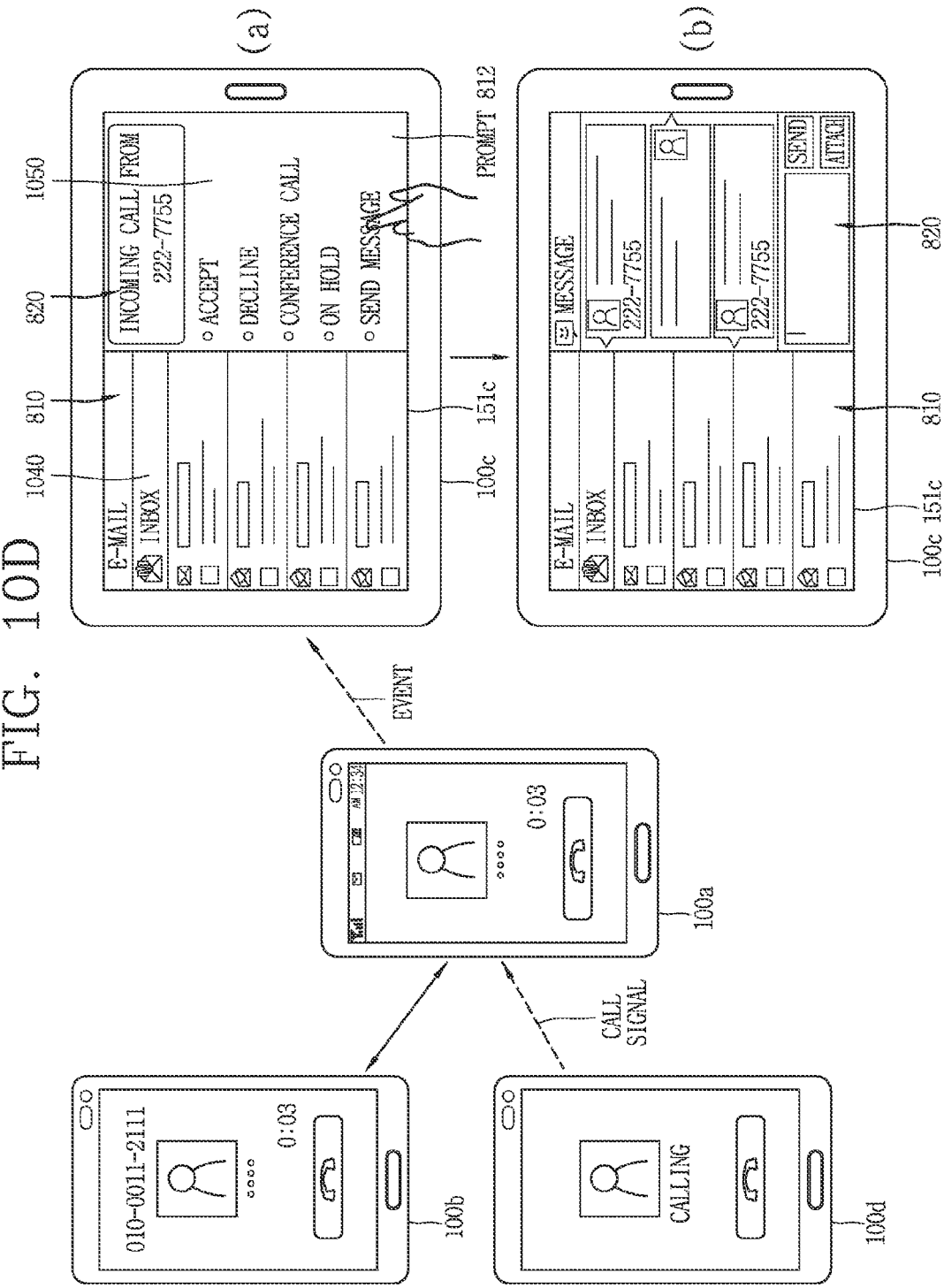

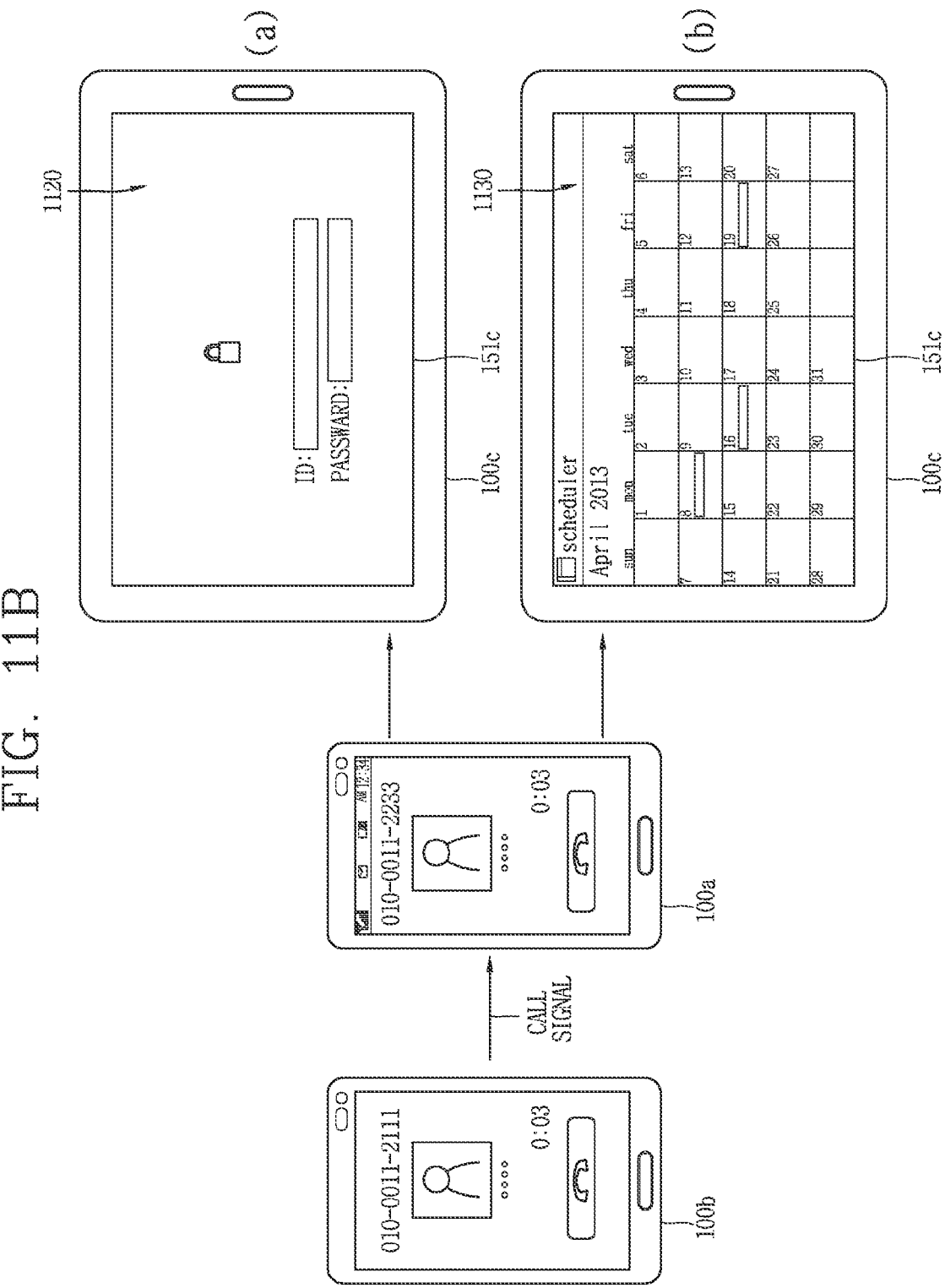

MOBILE TERMINAL AND CONTROL METHOD FOR THE MOBILE TERMINAL

CROSS-REFERENCE TO A RELATED APPLICATION

Pursuant to 35 U.S.C. §119(e), this application claims the benefit of priority from U.S. Provisional Patent Application Ser. No. 61/817,095, filed on Apr. 29, 2013, the contents of which is hereby incorporated by reference herein in its entirety. In addition, pursuant to 35 U.S.C. §119(a), this application claims the benefit of priority from Korean Patent Application No. 10-2013-0048917, filed on Apr. 30, 2013, the contents of which is hereby incorporated by reference herein in its entirety.

BACKGROUND OF THE INVENTION

1. Field of the Invention

The present invention relates to a mobile terminal for displaying information associated with at least one mobile terminal and a control method thereof.

2. Description of the Related Art

Terminals can be classified into two types, such as a mobile or portable terminal and a stationary terminal. The mobile terminal can be further classified into two types, such as a handheld terminal and a vehicle mounted terminal.

As it becomes multifunctional, for example, such a terminal can capture still images or moving images, play music or video files, play games, receive broadcast and the like, so as to be implemented as an integrated multimedia player. Furthermore, such a mobile terminal can communicate with at least other mobile terminal using near field communication.

Moreover, the improvement of structural or software elements of the terminal may be taken into consideration to support and enhance the functions of the terminal. Performing another function during the use of the terminal may be applicable to one of the structural changes and enhancements. In particular, while the user is talking over the phone to the other terminal, the user's implementation of another function (for example, text message transmission) is limited. Furthermore, when the terminal has a plurality of stored phone numbers, the problem becomes worse.

SUMMARY OF THE INVENTION

Accordingly one objective of the present invention is to provide a mobile terminal capable of transmitting an event signal to display information associated with any one mobile terminal on another mobile terminal in correspondence to a call signal being received at the any one terminal or a call being connected to the any one terminal, and a control method thereof.

Another objective of the present invention is to provide a mobile terminal capable of displaying information associated with any one mobile terminal on another mobile terminal in correspondence to a call signal being received at the any one terminal or a call being connected to the any one terminal, and a control method thereof.

In order to accomplish the foregoing objective, an objective of the present invention is to provide a mobile terminal capable of transmitting an event signal to display information associated with any one mobile terminal on another mobile terminal in correspondence to a call signal being received at the any one terminal or a call being connected to the any one terminal, and a control method thereof.

An objective of the present invention is to provide a mobile terminal capable of displaying information associated with any one mobile terminal on another mobile terminal in correspondence to a call signal being received at the any one terminal or a call being connected to the any one terminal, and a control method thereof.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating a mobile terminal according to an embodiment of the present invention;

FIG. 4 is a flow chart illustrating a method of transmitting signals based on the connection relation between mobile terminals illustrated in FIG. 3;

FIGS. 5A, 5B, 6A, 6B and 7 are conceptual views illustrating information being displayed in correspondence to an event signal being received according to a call signal in a mobile terminal according to an embodiment of the present invention;

FIGS. 10A, 10B, 10C and 10D are conceptual views illustrating a method of displaying information corresponding to a received event when the event is received at a mobile terminal located at a near distance from a mobile terminal according to an embodiment of the present invention;

FIGS. 11A and 11B are conceptual views illustrating a method of using the information of a mobile terminal located at a near distance from a mobile terminal according to an embodiment of the present invention.

DETAILED DESCRIPTION OF THE INVENTION

Figure 2A:
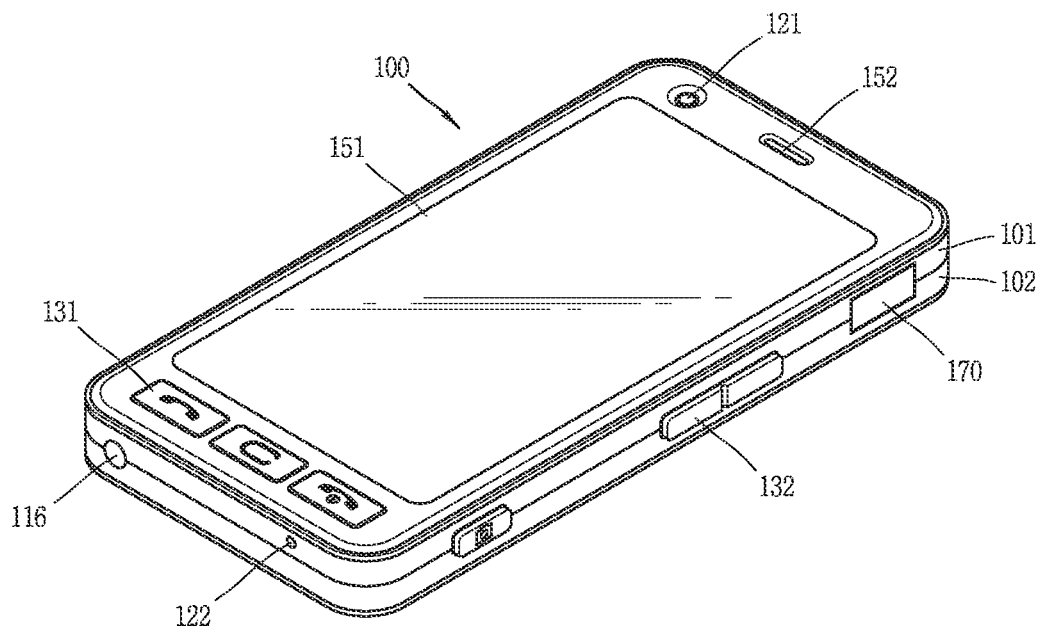
FIGS. 2A and 2B are perspective views illustrating the external appearance of the mobile terminal 100 associated with the present invention.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present invention. The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module Ill may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems. Broadcast signals and/or broadcast associated information received via the broadcast receiving module Ill may be stored in a memory 160.

The mobile communication module 112 transmits and receives wireless signals to and from at least one a base station, an external terminal and a server on a mobile communication network. Further, the wireless signals may include audio call signals, video call signals, or various formats of data according to the transmission and reception of text/multimedia messages.

The mobile communication module 112 may be configured to implement a video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Further, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Further, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (Wi-Fi) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and output into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The sensing unit 140 may include a proximity sensor, a stereoscopic touch sensing unit, an ultrasonic sensing unit and a camera sensing unit. The sensing unit 140 may be configured with a three-dimensional sensor for detecting the location of an object (hereinafter, referred to as a "sensing object") that exists and moves in a three-dimensional space. Further, the sensing object may be part (finger) of the user's body, an accessory device and the like.

The output unit 150 is configured to generate an output associated with visual sense, auditory sense or tactile sense, and may include a display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an inter-layer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Further, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 can sense which region of the display unit 151 has been touched.

In addition, a proximity sensor may be arranged at an inner region of the mobile device 100 surrounded by the touch screen, or adjacent to the touch screen. The proximity sensor may be provided as an example of the sensing unit 140. The proximity sensor refers to a sensor to sense the presence or absence of an object approaching to a surface to be sensed, or an object disposed adjacent to a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field, in this instance, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the mobile terminal 100 (e.g., sound alarming a call received or a message received, and so on). The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface, the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

In addition, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via the interface unit 170.

Furthermore, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 can include a multimedia module 181 which provides multimedia playback. The multimedia module 181 may be configured as part of the controller 180 or as a separate component.

The controller 180 can also perform a pattern recognition processing so as to recognize writing or drawing input performed on the touch screen as text or image. Furthermore, the controller 180 can implement a lock state for limiting the user's control command input to applications when the state of the mobile terminal satisfies a preset condition. In addition, the controller 180 can control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some instances, such embodiments may be implemented in the controller 180 itself.

For a software implementation, the embodiments such as procedures or functions described in the present invention may be implemented with separate software modules. Each of the software modules may perform at least one function or operation described in the present invention. Software codes can be implemented by a software application written in any suitable programming language. The software codes may be stored in the memory 160 and executed by the controller 180.

Hereinafter, a mobile terminal according to an embodiment of the present invention as illustrated above in FIG. 1 or a mobile terminal disposed with the constituent elements of the mobile terminal or the structure of a mobile terminal will be described.

Figure 2B:
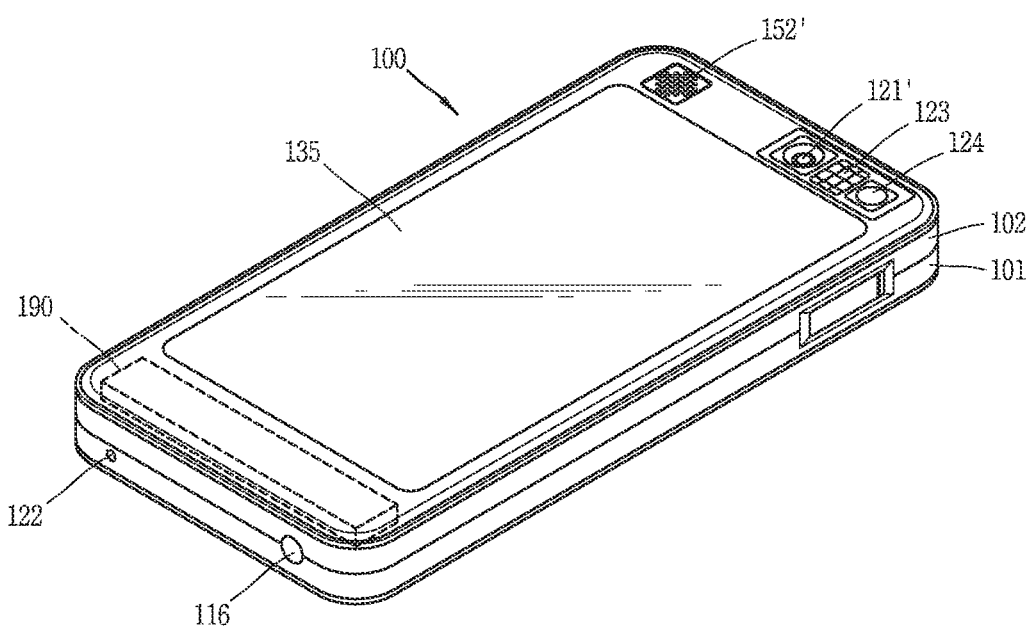

FIG. 2A is a front perspective view illustrating a mobile terminal according to an embodiment of the present invention or an example of the mobile terminal, and FIG. 2B is a rear perspective view illustrating a mobile terminal illustrated in FIG. 2A.

The mobile terminal 100 disclosed herein is provided with a bar-type terminal body. However, the present invention is not only limited to this type of terminal, but is also applicable to various structures of terminals such as slide type, folder type, swivel type, swing type, and the like, in which two and more bodies are combined with each other in a relatively movable manner.

According to the drawing, the terminal body 100 (hereinafter, referred to as a "body") may include a front surface, a lateral surface, and a rear surface. Furthermore, the body may include both ends thereof formed along the length direction.

The body 100 includes a case (casing, housing, cover, etc.) forming an appearance of the terminal. In this embodiment, the case may be divided into a front surface (hereinafter, referred to as a "front case") 101 and a rear surface (hereinafter, referred to as a "rear case") 102. Various electronic components may be incorporated into a space formed between the front case 101 and rear case 102. At least one middle case may be additionally disposed between the front case 101 and the rear case 102. The cases may be formed by injection-molding a synthetic resin or may be also formed of a metal material such as stainless steel (STS), titanium (Ti), or the like.

A display unit 151, an audio output module 152, a camera 121, a user input unit 130/131, 132, a microphone 122, an interface 170, broadcast antenna 116 and the like may be arranged on the terminal body 100, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102. On the contrary, the microphone 122 may be disposed at the other end of the body 100.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling.

The content input by the manipulation units 131, 132 may be set in various ways. For example, the first manipulation unit 131 may receive a command, such as start, end, scroll, or the like, and the second manipulation unit 132 may receive a command, such as controlling a volume level being output from the audio output unit 152, or switching it into a touch recognition mode of the display unit 151.

Referring to FIG. 2B, an audio output unit 152' may be additionally disposed on a rear surface, namely, the rear case 102, of the terminal body. The audio output unit 152' together with the audio output unit 152 can implement a stereo function, and it may be also used to implement a speaker phone mode during a phone call.

Furthermore, a power supply unit 190 for supplying power to the mobile terminal 100 may be mounted on a rear surface of the terminal body. The power supply unit 190 may be configured so as to be incorporated in the terminal body, or directly detachable from the outside of the terminal body.

In addition, a touch pad 135 for detecting a touch may be additionally mounted on the rear case 102. The touch pad 135 may be configured in an optical transmission type similarly to the display unit 151. In this instance, if the display unit 151 is configured to output visual information from both sides of the display unit 151, then the visual information may be also recognized through the touch pad 135. The information being output from the both sides thereof may be controlled by the touch pad 135. In addition, a display may be additionally mounted on the touch pad 135, and a touch screen may be also disposed on the rear case 102.

Furthermore, a camera 121' may be additionally mounted on the rear case 102 of the terminal body. The camera 121' has an image capturing direction, which is substantially opposite to the direction of the camera 121, and may have different pixels from those of the first video input unit 121.

For example, that the camera 121 may preferably have a relatively small number of pixels enough not to cause a difficulty when the user captures his or her own face and sends it to the other party during a video call or the like, and the camera 121' has a relatively large number of pixels since the user often captures a general object that is not sent immediately. The camera 121' may be provided in the terminal body 100 in a rotatable and popupable manner.

Furthermore, a flash 123 and a mirror 124 may be additionally disposed adjacent to the camera 121'. The flash 123 illuminates light toward an object when capturing the object with the camera 121'. The mirror allows the user to look at his or her own face, or the like, in a reflected way when capturing himself or herself (in a self-portrait mode) by using the camera 121'.

Further, an audio output unit 252' may be additionally disposed on a rear surface of the terminal body. The audio output unit 252' together with the audio output unit 252 (refer to FIG. 2A) can implement a stereo function, and it may be also used to implement a speaker phone mode during a phone call.

In addition, the power supply unit 190 for supplying power to the portable terminal 100 may be mounted on a rear surface of the terminal body. The power supply unit 190 may be configured so as to be incorporated in the terminal body, or directly detachable from the outside of the terminal body.

The touch pad 135 for detecting a touch may be additionally mounted on the rear case 102. The touch pad 135 may be configured in an optical transmission type similarly to the display unit 151. In this instance, if the display unit 151 is configured to output visual information from both sides of the display unit 151, then the visual information may be also recognized through the touch pad 135. The information being output from the both sides thereof may be controlled by the touch pad 135. In addition, a display may be additionally mounted on the touch pad 135, and a touch screen may be also disposed on the rear case 102.

The touch pad 135 operates in a reciprocal relation to the display unit 151 of the front case 101. The touch pad 135 may be disposed in parallel on a rear side of the display unit 151. The touch pad 135 may have the same or a smaller size as or than that of the display unit 151.

In addition, according to an embodiment of the present invention, a control method in which information associated with at least another mobile terminal can be displayed on any one mobile terminal through communication between a plurality of mobile terminals will be described in more detail below with reference to the accompanying drawings. Meanwhile, the plurality of mobile terminals may correspond to the configuration of a mobile terminal previously illustrated in FIGS. 1, 2A and 2B.

Figure 3:
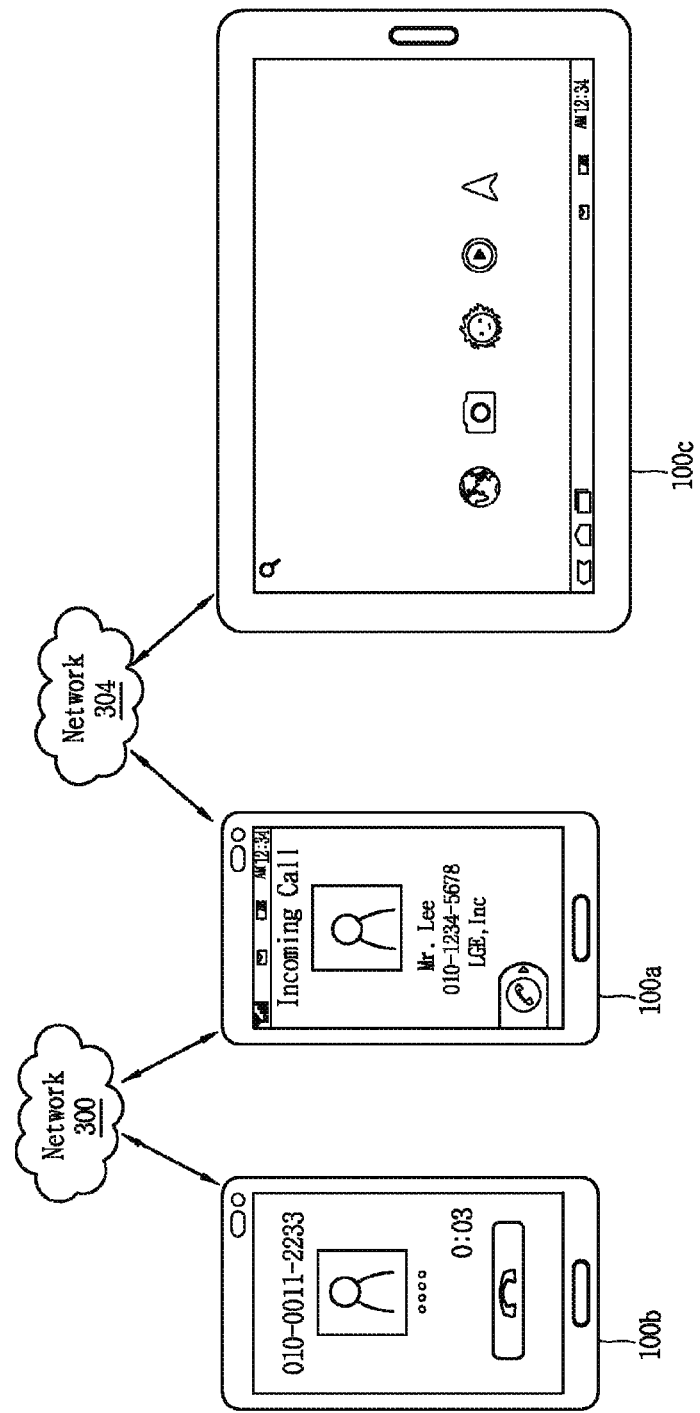
FIG. 3 is a conceptual view illustrating a connection relation between mobile terminals according to an embodiment of the present invention.

FIG. 3 is a conceptual view illustrating a connection relation between mobile terminals according to an embodiment of the present invention, and FIG. 4 is a flow chart illustrating a method of transmitting signals based on the connection relation between mobile terminals illustrated in FIG. 3.

According to an embodiment of the present invention, as illustrated in FIG. 3, a first terminal 100a may be connected to a second terminal 100b through a network 300, and connected to a third terminal 100c through a network 304 which is different from the network 300. Further, the network 300 for connecting between the first terminal 100a and the second terminal 100b may be a wireless network including various kinds of online networks (or computer networks).

For example, the wireless network may be at least one of a wireless personal area network, a wireless local area network, a wireless mesh network, a wireless metropolitan area network, a wireless wide area network and a cellular network.

Meanwhile, the kinds of wireless networks will not be necessarily limited to the foregoing examples.

In addition, the first and the second terminal 100a, 100b illustrated in FIG. 3 may communicate with each other over a 3G or 4G network. For example, the first terminal 100a may receive a call signal from the second terminal or transmit a call signal to the second terminal over a 3G or 4G network. However, the present invention is not limited to this, and the first and the second terminal 100a, 100b may communicate with each other using the next-generation communication schemes.

In addition, as illustrated in FIG. 3, the first terminal 100a may be connected to the third terminal 100c through the network 304. Further, the network 304 for connecting between the first terminal 100a and the third terminal 100c may be a personal area network (PAN). In addition, the wireless personal area network (WPAN) may perform PAN through a wireless network terminal such as IrDA, Wireless USB, Bluetooth, Z-Wave, ZigBee, or even Body Area Network. Furthermore, the PAN may be performed through a wired computer bus such as USB and FireWire. Furthermore, a near field communication (NFC) scheme may be also used as a kind of PAN.

In addition to the foregoing examples, the first terminal 100a and third terminal 100c may be connected over at least one of Wireless-Fidelity (Wi-Fi). Wireless-Fidelity Direct (Wi-Fi Direct), and Digital Living Network Alliance (DLNA). According to an embodiment of the present invention, the first terminal 100a may receive a call signal from the second terminal 100b or transmit a call signal to the second terminal 100b using the network 300. The first terminal 100a may also transmit an event signal to the third terminal 100c based on a call signal being received or transmitted between the first terminal 100a and the second terminal 100b.

In addition, the event signal can be transmitted to the third terminal 100c only when a call is connected between the first terminal 100a and the second terminal 100b. For example, when a call is not connected between the first terminal 100a and the second terminal 100b (even if a call signal is received from the second terminal 100b), the first terminal 100a may not transmit an event signal to the third terminal 100c.

In addition, the third terminal 100c may display information associated with the first terminal 100a based on the event signal being received. Further, the information associated with the first terminal 100a may be stored in advance in the third terminal 100c, and the third terminal 100c may detect at least part of the prestored information based on the event signal being received, and display the detected information on the display unit of the third terminal 100c.

In addition, the first terminal 100a may be designated by a plurality of IDs. Further, the ID is identification information that can specify the first terminal 100a, and the identification information (or ID) may be expressed with a uniform resource identifier (URI). More specifically, the identification information may be any one of Tell URI and SIP URI. Accordingly, when the first terminal 100a has a plurality of IDs, the first terminal 100a may be designated by a plurality of Tell URIs or by a plurality of SIP URIs. Moreover, the first terminal 100a may be designated by at least one Tell URI and at least one SIP URL When a plurality of Tell URIs are designated for the first terminal 100a, the first terminal may have a plurality of phone numbers corresponding to the plurality of IDs, respectively.

In addition, when the first terminal 100a has a plurality of Tell URIs, the first terminal 100a may include a plurality of subscriber identity modules (SIMs). In this instance, the first terminal 100a may include dual SIMs. As described above, when the first terminal 100a has a plurality of IDs, the third terminal 100c may display different information according to a call signal received or transmitted from the first terminal 100a corresponding to which one of the plurality of IDs.

In other words, an event signal transmitted from the first terminal 100a to the third terminal 100c may include the information of ID corresponding to a call signal received or transmitted from the first terminal 100a among the plurality of IDs of the first terminal 100a. Furthermore, information corresponding to different IDs, respectively, may be stored in advance in the third terminal 100c. Accordingly, the third terminal 100c may display information corresponding to an ID of the received event signal among the information corresponding to different IDs, respectively.

Hereinafter, the transmission of a call signal or event signal between the first, the second, and the third terminal 100a, 100b, 100 will be described in more detail with reference to FIG. 4. First, as illustrated in FIG. 4, the process of transmitting a call signal between the first and the second terminal 100a, 100b is performed (S410). The first terminal 100a and second terminal 100b can transmit a call signal over a 3G or 4G network.

In more detail, the first terminal 100a may receive a call signal from the second terminal 100b (S411) or transmit a call signal to the second terminal 100b (5412). In other words, the first terminal 100a may receive a call signal from the second terminal 100b or transmit a call signal to the second terminal 100b using the wireless communication unit.

When a call signal is transmitted between the first and the second terminal 100a, 100b, the process of transmitting an event signal from the first terminal 100a to the third terminal 100c is performed (S420). As discussed above, the event signal may be transmitted to the third terminal 100c only when a call is connected between the first terminal 100a and the second terminal 100b (S421). That is, when a call is not connected between the first terminal 100a and the second terminal 100b, the controller of the first terminal 100a may not transmit an event signal to the third terminal 100c.

In addition, as described above, when a plurality of IDs are designated for the first terminal 100a, the controller of the first terminal 100a may include information on the call signal associated with which one of the plurality of IDs in the event signal. For example, when a first and a second ID is designated for the first terminal 100a, if the call signal is a call signal associated with the first ID, then the first terminal 100a may transmit an event signal associated with the first ID to the third terminal 100c (S422). On the contrary, if the call signal is a call signal associated with the first ID between the first and the second ID, then the first terminal 100a may transmit an event signal associated with the second ID to the third terminal 100c (S423).

Thus, the first terminal 100a may determine that a call signal associated with the second terminal 100b corresponds to which one of the plurality of IDs, and transmit an event signal associated with the determined ID to the third terminal 100c.

In addition, when the first terminal 100a includes a plurality of IDs, only when a call signal associated with the second terminal 100b is generated, the first terminal 100a may first transmit an event signal that does not include information on an ID corresponding to the generated call signal among the plurality of IDs to the third terminal 100c. Then, the first terminal 100a may later transmit information on an IT) corresponding to the generated call signal among the plurality of IDs.

Further, the third terminal 100c displays information associated with the first terminal 100a on the display unit in correspondence to an event signal received from the first terminal 100a (S430). The information displayed on the third terminal 100c may be implemented in various ways based on the event signal received from the first terminal 100a, and is described below in more detail below.

In addition, as described above, according to an embodiment of the present invention, the first terminal 100a may transmit an event signal to the third terminal 100c to display information associated with the first terminal 100a on the third terminal 100c based on a call signal being received from the second terminal 100b or a call signal being transmitted to the second terminal 100b. Accordingly, the user of the first terminal 100a can perform a function associated with the first terminal 100a through the third terminal 100c located at a near distance from the first terminal 100a even when he or she cannot use the display unit of the first terminal 100a due to talking communicating with the second terminal 100b.

In addition, the first, the second and the third terminal 100a, 100b, 100c as described above may be named in a different manner according to circumstances. For example, when the second and the third terminal 100b, 100c are described based on the first terminal 100a, the first terminal 100a may be named as a "mobile terminal," and the second terminal 100b transmitting a call signal to the first terminal 100a may be named as "the other terminal". Furthermore, the third terminal 100c receiving an event signal from the first terminal 100a may be named as a "share terminal."

When the first terminal 100a is a mobile terminal, the controller and wireless communication unit perform the operations of receiving a call signal transmitted from the other terminal through the wireless communication unit, identifying that the call signal received from the other terminal corresponds to which one of the plurality of IDs, connecting to the other terminal in a wireless manner through the identified ID to respond to the received call signal, and transmitting an event signal corresponding to the identified ID to a share terminal to display information corresponding to the identified ID on the display unit of the share terminal.

In addition, when the first and the second terminal 100a, 100b are described based on the third terminal 100c, the third terminal 100c may be named as a "mobile terminal," and the first terminal 100a transmitting a call signal to the third terminal 100c may be named as a "share terminal," Furthermore, the second terminal 100b transmitting a call signal to the first terminal 100a may be named as "the other terminal."

In summary, when the third terminal 100c is a mobile terminal, information associated with a share terminal is stored in the memory unit of the mobile terminal, and the wireless communication unit of the mobile terminal receives an event signal transmitted from the share terminal when the share terminal is call-connected with the other terminal, and the controller of the mobile terminal detects information corresponding to the event signal from the information, and displays the corresponding information on the display unit of the mobile terminal.

As described above, the first, the second and the third terminal 100a, 100b, 100c may be named in a different manner according to circumstances, but according to an embodiment of the present invention, the reference numerals will be used in the same manner even though the names are changed when describing the first, the second and the third terminal 100a, 100b, 100c.

Hereinafter, information displayed on the third terminal 100c in correspondence to an event signal being received at the third terminal 100c will be described in more detail with reference to the accompanying drawings. Hereinafter, the third terminal 100c is designated as a "mobile terminal", the first terminal 100a as a "share terminal", and the second terminal 100b as "the other terminal". FIGS. 5A, 5B, 6A, 6B and 7 are conceptual views illustrating information being displayed in correspondence to an event signal being received according to a call signal in a mobile terminal according to an embodiment of the present invention.

First, as illustrated in FIG. 5A, the mobile terminal 100c according to an embodiment of the present invention may display information corresponding to the event signal on the display unit 151c in correspondence to the event signal being received from the share terminal 100a.

Information corresponding to the event signal may be stored in advance in the memory unit of the mobile terminal 100c. Furthermore, data corresponding to information to be displayed on the mobile terminal 100c in correspondence to an event signal may be included in the event signal.

For example, information corresponding to the event signal may be an icon of the application, a widget or content itself. Further, the content may denote multimedia content such as electronic document, memo, image and video. In addition, information corresponding to the event signal may be at least one graphic object (or icon) that can be used to generate a control command (or control signal) associated with the share terminal 100a.

In addition, as previously described in FIGS. 3 and 4, when a plurality of IDs are designated for the share terminal 100a, the mobile terminal 100c according to an embodiment of the present invention may display different screen information based on that an ID corresponding to event information received from the share terminal 100a corresponds to which one of the plurality of IDs.

Figure 5B:
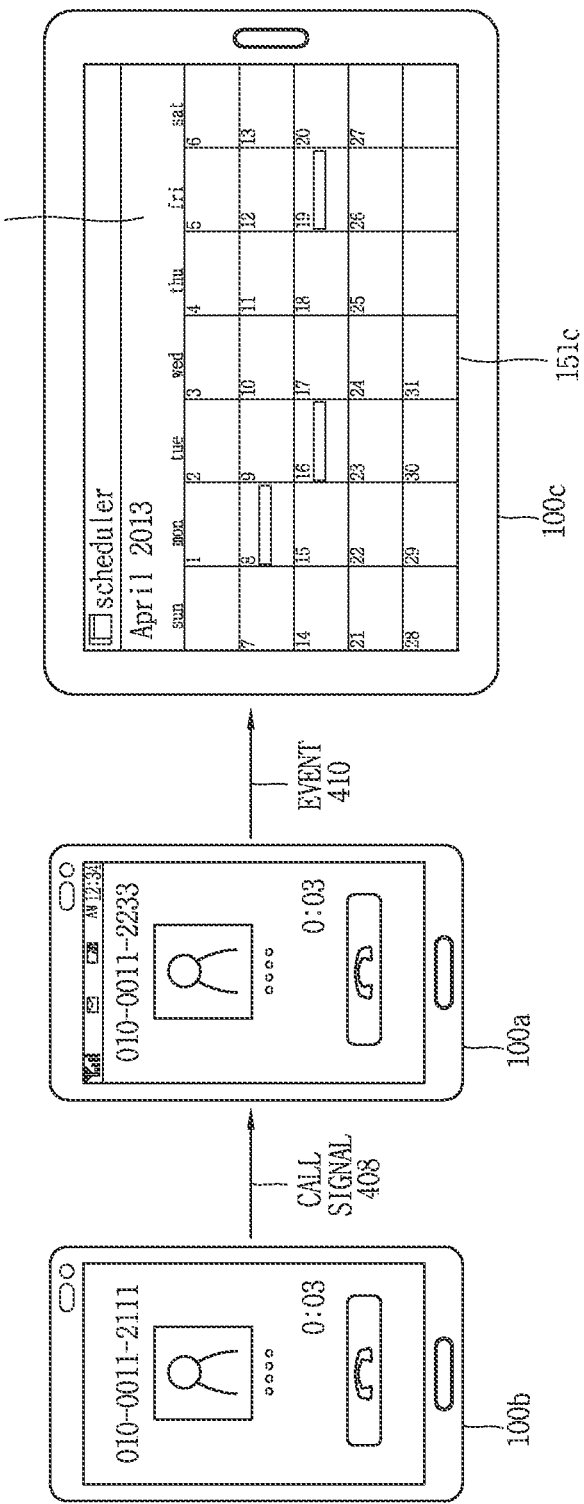

For example, there are situations where a call signal 402 received from the other terminal 100b illustrated in FIG. 5A and a call signal 408 received from the other terminal 100b illustrated in FIG. 5B are received with different IDs, respectively, among a plurality of IDs of the share terminal 100a. In this instance, the share terminal 100a may transmit different event signals 404, 410 to the mobile terminal 100c as illustrated in FIGS. 5A and 5B. Accordingly, the third terminal 100c may display different information 510, 520, respectively, on the display unit 151c based on different event signals 404, 410.

In this instance, the event signal may include a signal indicating that it is connected to the other terminal in a wireless manner through which one of a plurality of phone numbers contained in the mobile terminal. In another example, the event signal may include a signal indicating that it is connected to the other terminal in a wireless manner through which one of a plurality of SIM cards contained in the mobile terminal.

More specifically, the user may use a first ID to perform an activity associated with "private life", and a second ID to perform an activity associated with "business", among a plurality of IDs. As illustrated in FIG. 5A, information 510 associated with private life (for example, messenger, photo album, information corresponding to a function associated with SNS or the like, or first information) may be displayed on the display unit 151c of the mobile terminal 100c.

Furthermore, as illustrated in FIG. 5B, information 520 associated with business (for example, schedule, information corresponding to a function associated with email or the like, or second information) may be displayed on the display unit 151c of the mobile terminal 100c. Also, the first and the second information are expressed as different graphic user interfaces (GUIs) on the display unit of the mobile terminal 100c.

In addition, information to be displayed when receiving a first event signal and when receiving a second event signal may be stored in the memory unit of the mobile terminal 100c. Accordingly, the controller of the mobile terminal 100 may determine that the received event signal corresponds to which one of the plurality of IDs, and display information associated with an ID corresponding to the event signal among the information on the display unit.

Further, the mobile terminal 100c may display information associated with each other between the share terminal 100a and the other terminal 100b in correspondence to an event signal being received from the share terminal 100a. In other words, the controller of the mobile terminal 100c may display (for example, history information) associated with a function that has been performed between the share terminal 100a and the other terminal 100b on the display unit.

The associated information may be contained in an event signal received at the mobile terminal 100c from the share terminal 100a. In another example, the mobile terminal 100c may receive the information of the other terminal along with the event signal through the wireless communication unit.

In addition, the controller of the mobile terminal 100c may process information associated with the other terminal 100b among information 510 displayed in correspondence to an event signal being received from the share terminal 100a in a highlighted manner. In other words, the controller can display information associated with the other terminal 100b to be distinguished from the other information such that the information associated with the other terminal 100b among the information 510 displayed in correspondence to an event signal being received can be identified by the user. Further, highlighting may be implemented through various visual methods such as changing the color of a region displayed with the associated information, displaying blinking, changing transparency, and the like.

Figure 6A:
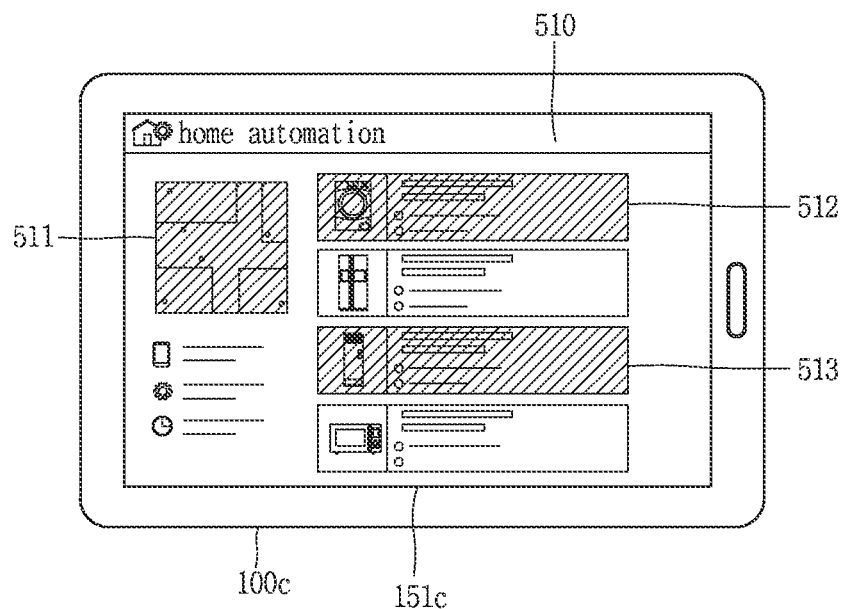

For example, as illustrated in FIG. 6A, the controller of the mobile terminal 100c may display information associated with the other terminal on the display unit. More specifically, when information associated with the other terminal 100b is information on an application, the controller of the mobile terminal 100c may process the icons 511, 512, 513 of an application corresponding to the associated information among the information 510 in correspondence to an event signal being received.

In another example, information associated with the other terminal 100b may be information associated with a function that has been performed by the share terminal 100a along with the other terminal 100b. More specifically, when the other terminal 100b and share terminal 100a are call-connected while the other terminal 100b and share terminal 100a transmits and receives a message therebetween, a message window may be displayed on the mobile terminal 100c.

In another example, the controller of the mobile terminal 100c may display information associated with the other terminal 100b in a separate region. The controller can partition (or divide) the screen display region of the display unit 151c into at least two regions to display information associated with the other terminal 100b in any one region 610, and display information 510 (refer to FIG. 6A) displayed in correspondence to the event signal being received in the other region 620. In this instance, the controller can reduce the display size of the information 510 (refer to FIG. 6A) displayed in correspondence to the event signal being received (refer to 510') to correspond to the size of the divided region.

Furthermore, the controller can display a popup window with information associated with the other terminal 100b. The displayed location of the popup window may be changed or the display of the popup window may be changed according to the user's selection.

In addition, the information associated with the other terminal 100b may be image, video and audio information with which the user of the other terminal is tagged. Furthermore, the information associated with the other terminal 100b may be a call log, chat content, message incoming or outgoing statements, email content, a number of emails, and outgoing statements, and the like.

Figure 6B:
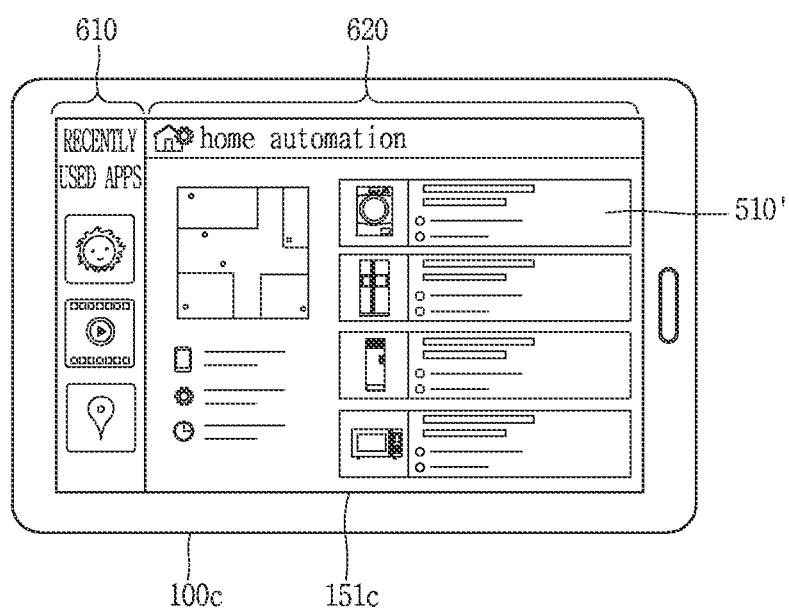
Figure 7:
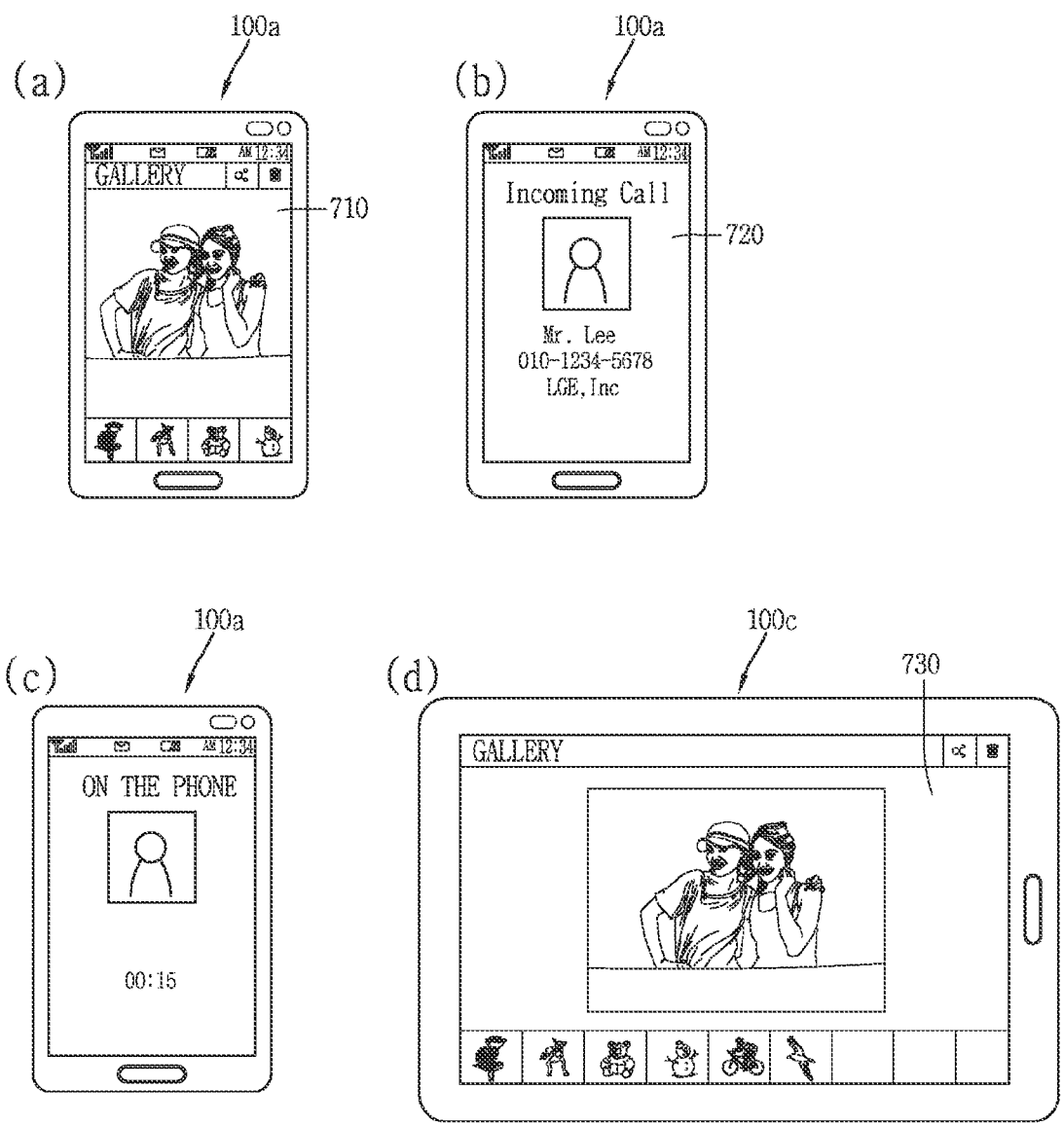

A control method referring to FIGS. 6A and 6B may be possible even when the share terminal 100a has a signal ID. Hereinafter, embodiments which will be described below may be applicable when all share terminals have a signal ID (or signal phone number).

In addition, the mobile terminal 100c according to an embodiment of the present invention may display information that has been displayed prior to receiving a call signal at the share terminal 100a on the display unit 151 in correspondence to an event signal being received. In this instance, the event signal received at the mobile terminal 100 from the share terminal 100a may be formed such that the share terminal 100a notifies a function that has been performed while receiving a call signal from the other terminal 100b.

Upon receiving the event signal, information associated with a function that has been performed while connecting to the call signal may be displayed on the display unit of the mobile terminal 100c. Furthermore, the event signal may include a function that has been performed while receiving a call signal from the other terminal 100b as well as information itself that has been displayed through the function.

For example, when a call signal is received as illustrated in FIG. 7(b) while information 710 corresponding to a photo album function is displayed on the share terminal 100a as illustrated in FIG. 7(a), information 720 associated with a call may be displayed on the share terminal 100a. In this manner, information 710 corresponding to a photo album function that has been displayed prior to receiving the call signal is no longer displayed, and thus the user may have a need to continuously use the information 710 corresponding to the photo album function.

Accordingly, the controller of the mobile terminal 100c may display information 730 corresponding to a photo album function, which is information that has been displayed prior to receiving a call signal at the share terminal 100a, on the display unit 151 in correspondence to the event signal being received as illustrated in FIG. 7(d). Thus, the user can continuously perform a function that has been performed on the share terminal 100a through the mobile terminal while performing a phone call on the share terminal 100a as illustrated in FIG. 7(c).

As described above, a mobile terminal according to an embodiment of the present invention may receive an event signal in correspondence to a call being received at the share terminal, and display information associated with the received event signal. Further, the information associated with an event signal may be information associated with the share terminal or the share terminal and the other terminal.

Therefore, the user can use information associated with the share terminal through the mobile terminal while performing a phone call with the share terminal. In other words, a mobile terminal and a control method thereof according to an embodiment of the present invention can solve a problem in which the display unit of the any one mobile terminal cannot be used while a phone call function is performed in the any one mobile terminal.

Hereinafter, a method of displaying screen information corresponding to the event signal of the share terminal on the mobile terminal will be described in more detail with reference to the accompanying drawings. In particular, FIGS. 8 and 9 are conceptual views illustrating a method of displaying information corresponding to a received event signal according to an embodiment of the present invention.

As described above, the mobile terminal 100c according to an embodiment of the present invention may display information associated with an event signal received from the share terminal 100a. In this instance, the mobile terminal 100c may partition (divide) the display unit 151c into a plurality of regions 810, 820, and display different information on the plurality of divided regions 810, 820.

For example, the controller of the mobile terminal 100c may display information associated with the event signal in a first region 810 among the plurality of regions, and continuously display information that has been displayed on the display unit 151c prior to receiving the event signal in a second region 820. Further, information that has been displayed on the display unit prior to receiving the event signal may be displayed in a reduced size in the second region 820.

In addition, information that can be displayed in such a plurality of regions may be different from one another by various combinations. For example, when the plurality of regions includes two regions, the combinations of information that can be displayed with the two regions may include: i) information associated with an event signal and information that has been displayed on the display unit 151c prior to receiving an event signal (refer to FIG. 8A), ii) information that has been displayed on the share terminal 100a prior to receiving a call signal at the share terminal 100a and information associated with an event signal (refer to FIG. 8B), and iii) information that has been displayed on the share terminal 100a prior to receiving a call signal at the share terminal 100a and information associated with an event signal and information that has been displayed on the display unit 151c prior to receiving an event signal.

In addition, the size of the plurality of regions and information displayed in each region may be changed based on the user's selection. Furthermore, at least any one of the plurality of regions may disappear based on the user's selection. In other words, in this instance, the controller can terminate the partitioning of the display unit 151c.

Figure 8A:
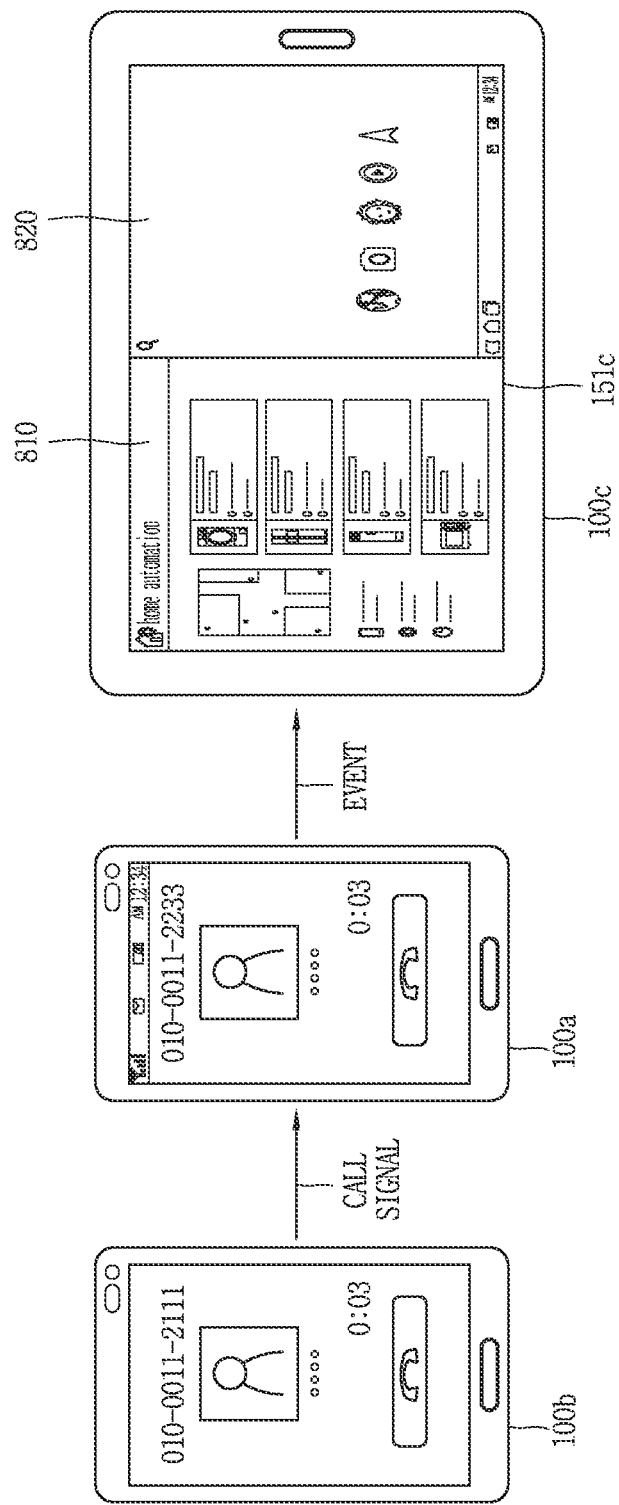
FIGS. 8A, 8B, 8C, 9A and 9B are conceptual views illustrating a method of displaying information in correspondence to an event signal being received according to a call signal in a mobile terminal according to an embodiment of the present invention.
Figure 8B:
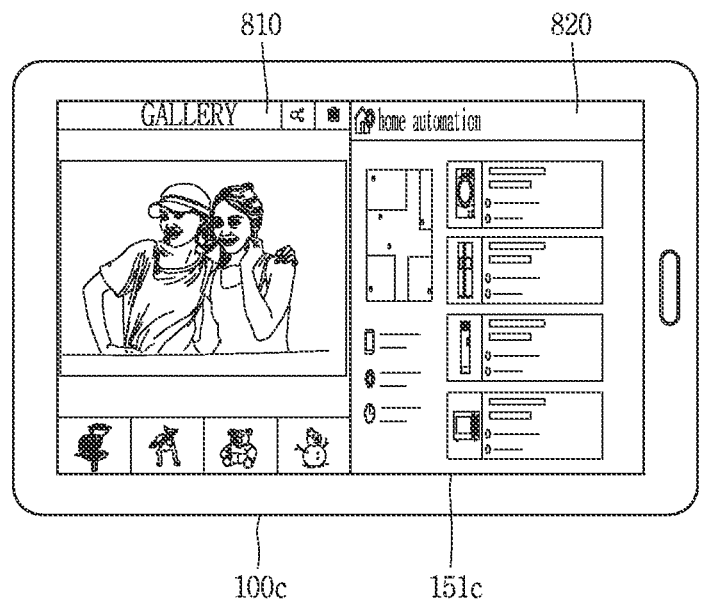
Figure 8C:
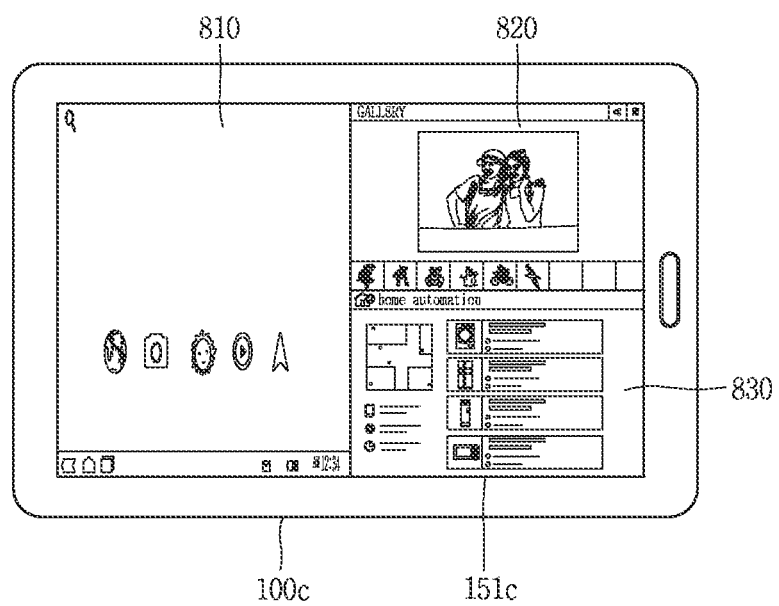

In addition, as illustrated in FIG. 8C, the controller of the mobile terminal according to an embodiment of the present invention may partition the display unit 151c into at least three regions 810, 820, 830. Through this, the mobile terminal may display all together i) information associated with an event signal and information that has been displayed on the display unit 151c prior to receiving an event signal, ii) information that has been displayed on the share terminal 100a prior to receiving a call signal at the share terminal 100a, and iii) information associated with an event signal (refer to FIG. 8B).

In addition, as illustrated in FIGS. 8A and 8B, upon receiving an event signal, the mobile terminal 100e according to an embodiment of the present invention may i) immediately partition the display unit 151c into a plurality of regions, or ii) immediately display information corresponding to the event signal as illustrated in FIG. 4, and otherwise, iii) display information partition the display unit 151c into a plurality of regions or partition the display unit 151c into a plurality of regions based on the user's selection.

Figure 9A:
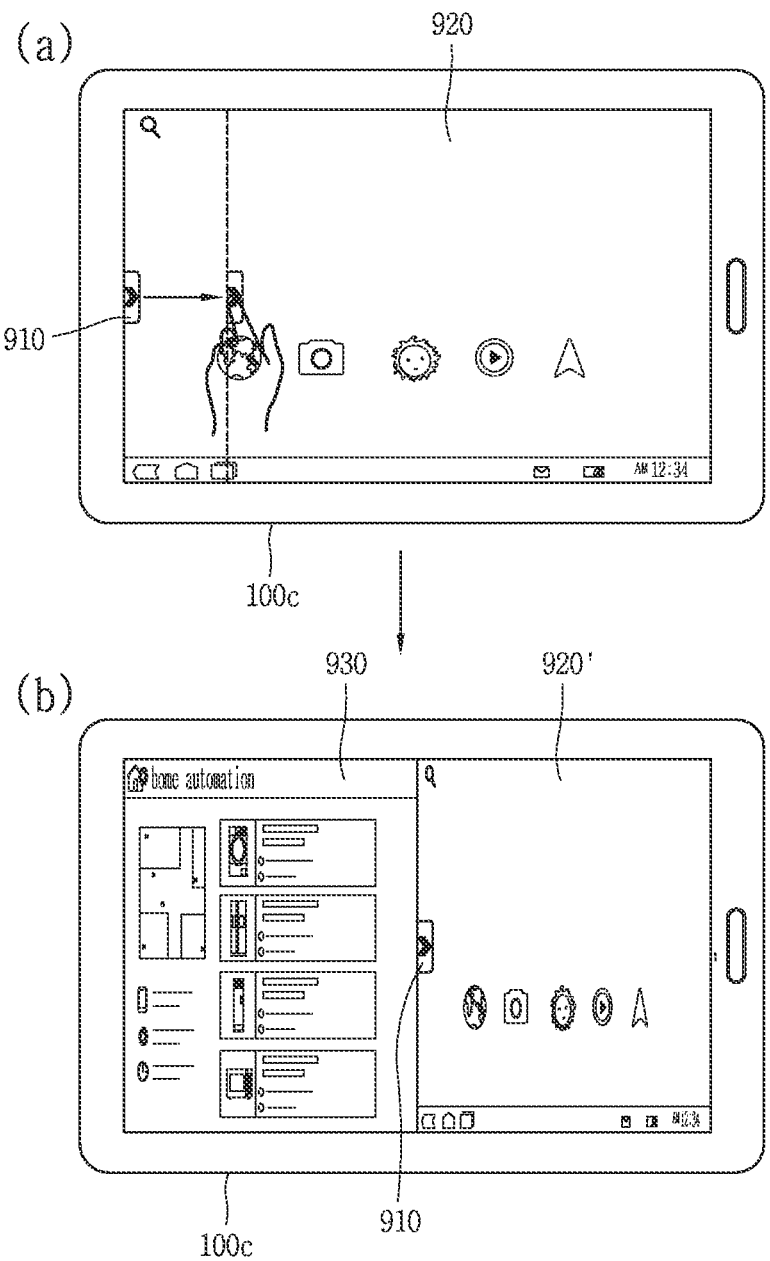

For example, the controller can display a graphic object (or icon including an indicator 910) used to receive a control command for displaying information corresponding to an event signal as illustrated in FIG. 9A(a). In this instance, information 920 that has been displayed on the display unit 151c prior to receiving an event signal may be continuously displayed on the display unit 151c even when the event signal is received from the share terminal 100a.

Furthermore, when a touch with a preset scheme is applied to the graphic object 910, the controller can display information corresponding to an event signal in at least one region 930 of the display unit 151c as illustrated in FIG. 9A(b). In addition, the touch with a preset scheme to the graphic object 910 may be a touch with a dragging or flicking scheme. In another example, the touch may be a double touch, a long touch, a short touch, and the like.

The controller 180 can adjust the size of the one region 930 according to the degree of the graphic object 910 being dragged. In addition, information displayed in the one region 930 may be overlapped with the information 920 that has been displayed on the display unit 151c prior to receiving the event signal. Furthermore, as illustrated in FIG. 9A, the information 920' that has been displayed on the display unit 151c prior to receiving the event signal may be displayed in a reduced size dependent on the size of the one region 930.

Figure 9B:
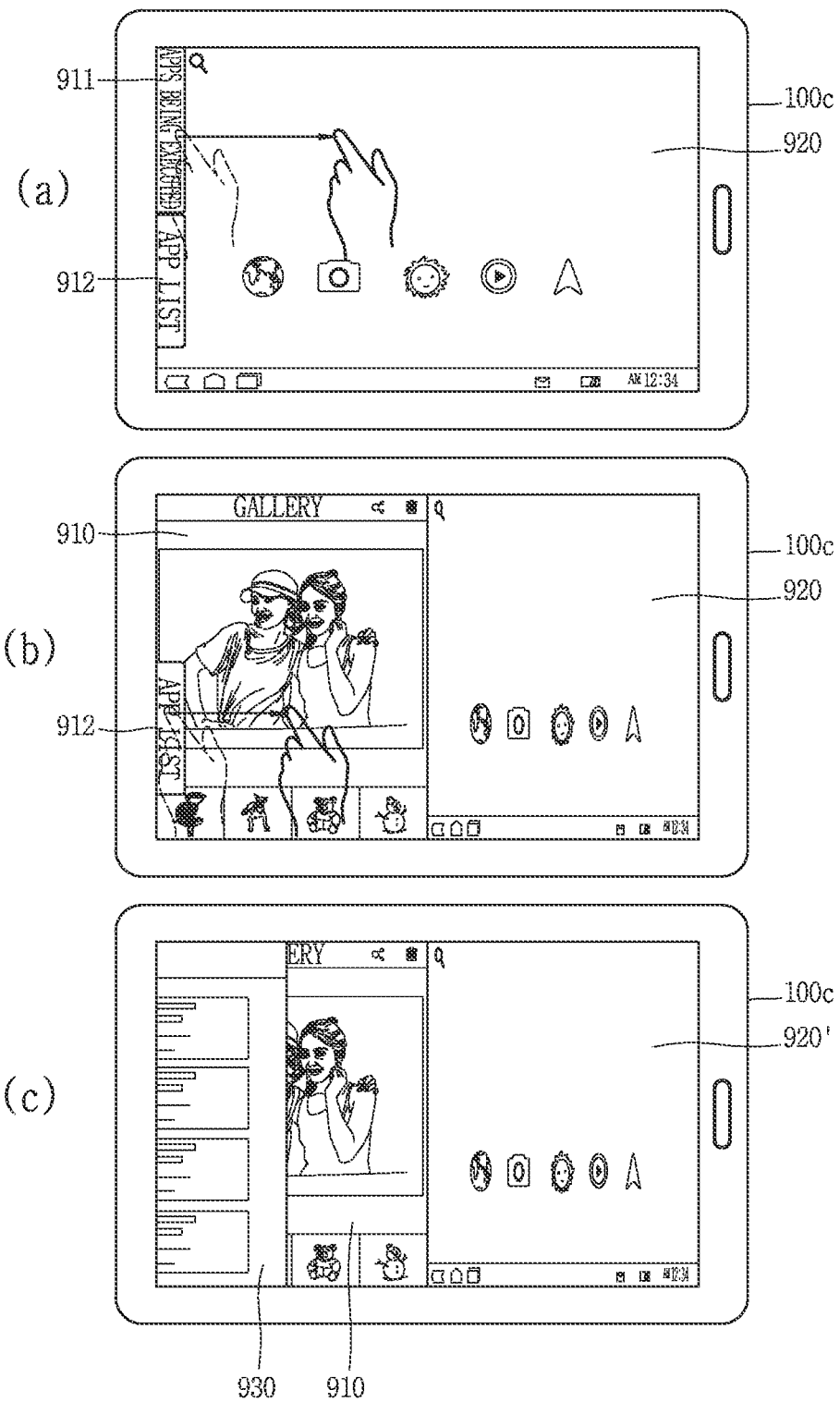

In addition, when the kind of information that can be displayed on the mobile terminal 100c in correspondence to an event signal being received is a plural number, the controller can display graphic objects 911, 912 corresponding to a plurality of kinds of the information, respectively, as illustrated in FIG. 9B.

Further, the plurality of kinds of the information may be i) information associated with an event signal, ii) information that has been displayed on the share terminal 100a prior to receiving a call signal at the share terminal 100a, and iii) information associated with each other between the share terminal 100a and the other terminal 100b.

In addition, as illustrated in FIGS. 9B(a), 9B(b) and 9B(c), when a touch with a preset scheme is applied to either one of the graphic objects 911, 912, the controller can display information corresponding to an object to which the touch is applied in at least one region 930 of the display unit 151c.

Hereinafter, when another event occurs on the share terminal 100a while information corresponding to an event signal being received at the share terminal 100a is displayed on the mobile terminal 100c, information displayed on the mobile terminal 100c will be described in more detail below with reference to the accompanying drawings. In particular, FIGS. 10A-10D are conceptual views illustrating a method of displaying information corresponding to a received event when the event is received at a mobile terminal located at a near distance from a mobile terminal according to an embodiment of the present invention.

According to an embodiment of the present invention, the mobile terminal 100c and the share terminal 100a may continuously communicate with each other through a PAN. In this instance, the mobile terminal 100c may communicate with the share terminal 100a through a PAN only when a call is connected between the share terminal 100Ia and the other terminal 100b.

Because it is possible to continuously connect to the share terminal 100a, when an event occurs on the share terminal 100a, the mobile terminal 100c may receive event information corresponding to the occurred event from the share terminal 100a. Further, the event may occur when a message is received at the share terminal 100a, or a call signal other than a call currently connected to the share terminal 100a is received at the share terminal 100a, or a push message is received through an application installed on the share terminal 100a.

For example, when the share terminal 100a receives a message while the share terminal 100a maintains a call connection to the other terminal 100b, information associated with the message may be displayed on the display unit of the mobile terminal 100c. Otherwise, when the share terminal 100a receives another call signal while the share terminal 100a maintains a call connection to the other terminal 100b, information associated with the another call signal may be displayed on the display unit of the mobile terminal 100c.

In addition, the share terminal 100a may transmit only event information corresponding to an event corresponding to a preset kind among the occurred events to the mobile terminal 100c. For example, the share terminal 100a may transmit the corresponding event information to the mobile terminal 100c when there occurs an event receiving a message or receiving another call signal, and may not transmit the corresponding event information to the mobile terminal when there occurs an event receiving a push message through an application.

In addition, an event occurring on the share terminal 100a may be an event received from the other terminal 100b, which is call-connected with the share terminal 100a. Moreover, an event occurring on the share terminal 100a may be an event received from a third terminal or server other than the call-connected other terminal 100b.

Further, when event information is received from the share terminal 100a, the mobile terminal 100c according to an embodiment of the present invention may display information corresponding to the received event information. For example, when a message event occurs on the share terminal 100a, the mobile terminal 100c may receive event information corresponding to the occurred message event from the share terminal 100a.

Furthermore, as illustrated in FIG. 10A(a), notification information 1010 for notifying that an event is received at the share terminal 100a may be displayed on the display unit 151c. In addition, the controller can display event information (for example, message content 1020) corresponding to the received event in at least one region of the display unit 151c by the user's selection or automatic selection as illustrated in FIG. 10A(b).

Meanwhile, the controller can immediately display event information (for example, message content 1020) corresponding to the received event in at least one region of the display unit 151c without displaying the notification information 1010 as illustrated in FIG. 10A(b). Further, a location at which the event information 1020 is displayed in the at least one region, a display size, display termination or non-termination and the like may be determined or changed based on the user's selection.

In addition, if the occurred event is a message receive event, the mobile terminal 100c may transmit a response to the other terminal of the message receive event based on the user's selection. In this instance, the identification information of the share terminal 100a may be contained in "outgoing information" on the response. In other words, the mobile terminal 100c may allow the "outgoing information" on the response to include only the identification information of the share terminal 100a or the identification information of the share terminal 100a and the identification information of the mobile terminal 100c together.

If the share terminal 100a has a plurality of IDs, then the mobile terminal 100c determines an ID used for a call connection between the mobile terminal 100c and the other terminal, and transmits information (for example, phone number) corresponding to the determined ID to the other terminal. Furthermore, mobile terminal 100c may transmit information corresponding to the response to the share terminal 100a. In this instance, a resultant terminal transmitting the response to the other terminal may be the share terminal 100a.

In addition, when at least part of the content corresponding to event information corresponding to the received event can be processed in mutual connection with an application, the controller can drive an application associated with event information corresponding to the received event. For example, when geographic information such as address information is contained in the event information, the controller can execute a map function application and display a map corresponding to the geographic information, and display execution screen information corresponding to the executed application as illustrated in FIG. 10B(b). In this instance, the execution screen information of the executed application may be associated with the event information.

For example, the corresponding information to the execution screen may be a map of the region corresponding to address information contained in the event information. In another example, when URL information is contained in the event information, the controller can execute an application corresponding to a web browser function. The controller can also determine whether or not to execute the associated application based on the user's selection as illustrated in FIG. 101B(a).

More specifically, when a message is received at the share terminal 100a while a call connection is maintained between the share terminal 100a and the other terminal 100b, information associated with the message is displayed on the display unit of the mobile terminal 100c, and an execution icon is contained in information associated with the message. When the execution icon is selected, information corresponding to the event signal is converted into the execution screen of a function linked to the execution icon.

In addition, as described above, when a plurality of IDs are designated for the share terminal 100a, and an event occurs on the share terminal 100a, the share terminal 100a may transmit identification information notifying that the occurred event corresponds to which one of the plurality of IDs to the mobile terminal 100c along with event information corresponding to the occurred event. Further, the identification information may be transmitted to the mobile terminal 100c along with the event information.

In addition, the mobile terminal 100c may display identification information 1031 notifying that the occurred event corresponds to which one of the plurality of IDs along with the event information (for example, message content 1030 corresponding to message event occurrence) as illustrated in FIG. 10C. Furthermore, when the occurred event is associated with an ID which is different from an ID corresponding to a call currently connected to the share terminal 100a, the controller can display an ID (or identification information 1032) corresponding to a call currently connected to the share terminal 100a at the same time.

First and second information associated with each ID of the share terminal designated by the first and the second ID are stored in the memory unit. Furthermore, when an event occurring on the share terminal 100a is a call receiving (or incoming, call signal receiving) event, the mobile terminal 100c may display a list 1050 including items corresponding to functions, respectively, that can be performed in correspondence to the event in one region 820 of the display unit 151c as illustrated in FIG. 10D(a). Accordingly, the user can select any one of the items contained in the list 1050, thereby performing a function associated with an event occurred on the share terminal 100a.

In addition, when any one of the item contained in the list 1050 is selected, information for performing the selected function may be displayed on the display unit 151c of the mobile terminal 100c as illustrated in FIG. 10D(b). Further, when an event occurred in a state that a call is connected in the share terminal 100a is a call receiving (or incoming, call signal receiving) event, the associated function may be a reception decline, reception accept, conference call, on hold, a message send function or the like.

Also, when a plurality of IDs are designated for the share terminal 100a, a call receiving event occurred in a state that a call is connected in the share terminal 100a may be an event corresponding to an ID which is different from an ID corresponding to a currently connected call among the plurality of IDs. Meanwhile, screen information 1040 that has been continuously displayed on the display unit 151c may be displayed in another region 810 on which the list 1050 is not displayed, along with the list 1050 on the display unit 151. Meanwhile, information on a function that can be performed in correspondence to the event may be displayed in various forms.

In addition, the division of a screen according to an embodiment described with reference to FIG. 10D may be also applicable to when the share terminal has a first and a second ID. For example, when a first and a second event signal corresponding to the first and the second ID, respectively, are sequentially received at the share terminal, the display unit may be divided into a first and a second region in which first information associated with the first ID and second information associated with the second ID are displayed, respectively.

As described above, when an event occurs on the share terminal 100a, the mobile terminal 100c according to an embodiment of the present invention may display information corresponding to the occurred event on the display unit of the mobile terminal 100, thereby allowing the user of the share terminal 100a to check the received event in real time even while talking on the phone.

Figure 11A:
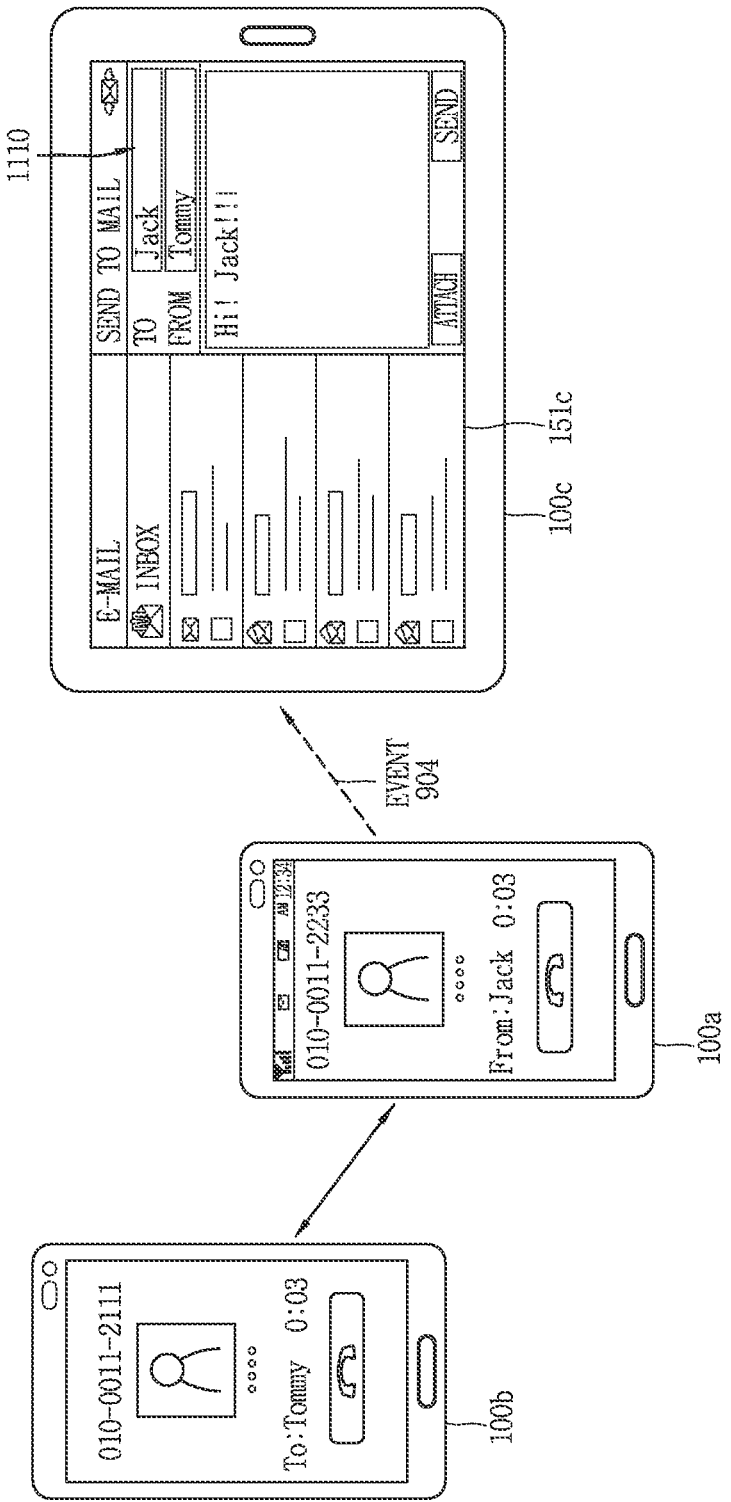

Hereinafter, a method of performing a function in the mobile terminal using the information of the other terminal and share terminal will be described in more detail below with reference to the accompanying drawings. FIGS. 11A and 11b are conceptual views illustrating a method of using the information of a mobile terminal located at a near distance from a mobile terminal according to an embodiment of the present invention.

In the mobile terminal 100c according to an embodiment of the present invention, a call is connected between the share terminal 100a and the other terminal 100b, and information associated with an event signal received in correspondence to this may be displayed thereon. Further, information associated with the event signal may be information corresponding to a specific function or a specific application. Furthermore, information corresponding to the specific function (e.g., specific application) may be displayed by being selected through information associated with the event signal.

For example, when information associated with the event signal is information on a plurality of applications, the controller of the mobile terminal 100c may display information corresponding to a specific function among the plurality of applications based on the user's selection. In this instance, the controller can process information corresponding to the specific function in connection with at least one of the share terminal 100a and the other terminal 100b.

Further, an event signal transmitted by the share terminal 100a may include an execution command for the application to execute the application of the share terminal 100a. In this instance, when the share terminal 100a has a plurality of IDs, the application may be an application associated with the identified ID.

Moreover, the application may be set to request the input of additional information while being executed in the share terminal 100a, and the event signal may include the additional information or may include a control command for releasing an input request for the additional information.

For example, as illustrated in FIG. 11A, when a name set to the ID of the share terminal 100a is "Tommy", and a name set to the ID of the other terminal 100b is "Jack", and an email creation function is executed (refer to reference numeral 1110), the controller can automatically set the information of the sender and recipient to "Tommy" and "Jack", respectively, among information associated with the email.

Furthermore, as illustrated in FIG. 11B, when an electronic document 1130 for which security is set, which is transmitted from the share terminal 100a, is displayed on the mobile terminal 100c, the controller can immediately display the electronic document for which security is set as illustrated in FIG. 11B(b) without using the process of removing the security screen 1120 as illustrated in FIG. 1113(*a*). In other words, the security information (for example, at least one of the ID and password) for which security is set may be received in advance from the share terminal 100a, and accordingly, the electronic document for which security is set may be transmitted to the mobile terminal 100c while the security is removed.

Also, the share terminal 100a may transmit the electronic document for which security is set to the mobile terminal 100c along with the security information without removing the security of the electronic document for which security is set. In this instance, the controller of the mobile terminal 100c may receive the security information from the share terminal 100a, and remove the security of the electronic document for which security is set, and then display the electronic document 1130 as illustrated in FIG. 11B(b).

In addition, the electronic document for which security is set may be immediately displayed without using the process or removing the security only when the share terminal 100a or the mobile terminal 100c is positioned at a preset location. For example, when the electronic document is associated with "business", the mobile terminal 100c may display the electronic document without using the process of removing the security of the electronic document only when the mobile terminal 100c or the share terminal 100a is positioned in a region (for example, the user's office) associated with "business".

In addition, since the mobile terminal 100c and share terminal 100a are located at a near distance, the controller of the mobile terminal 100c may use location information collected from either one of the mobile terminal 100c and the share terminal 100a to determine whether or not to immediately display the electronic document.

Figure 12A:
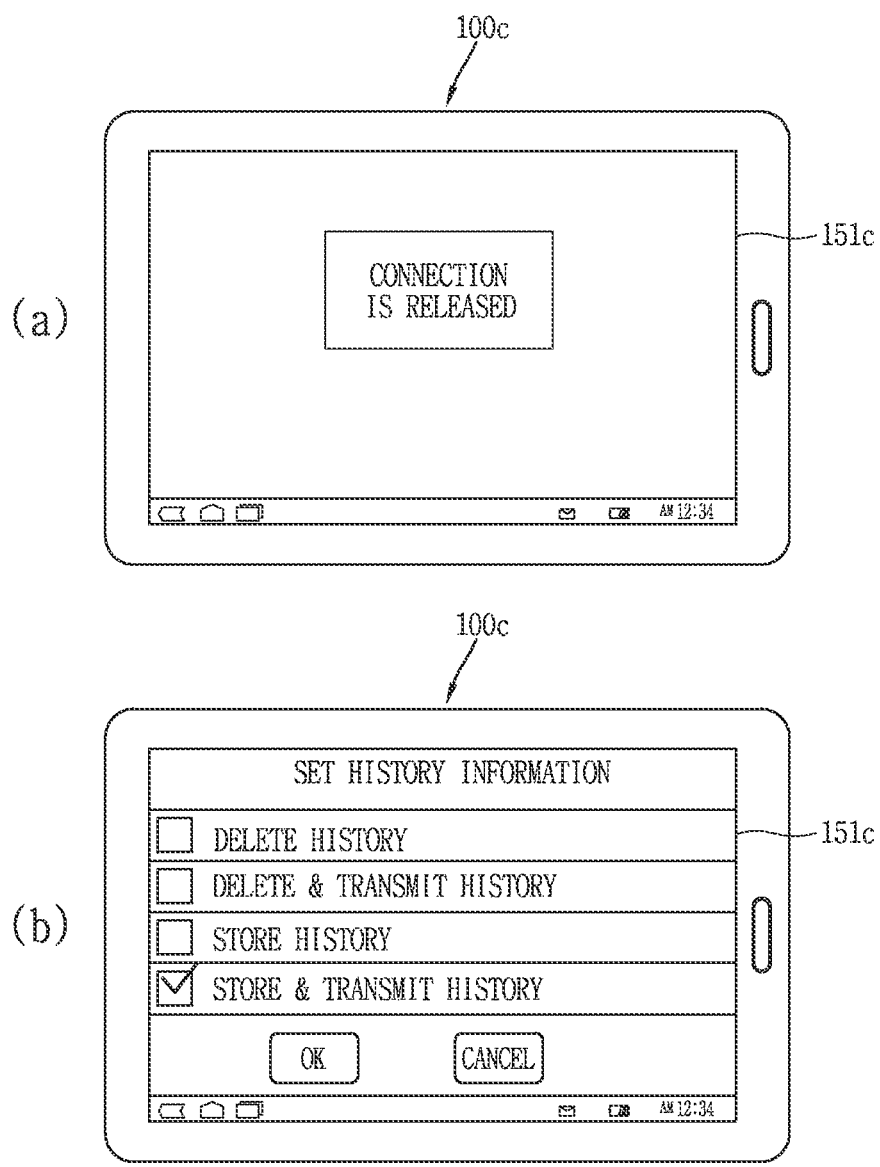
FIGS. 12A and 12B are conceptual views illustrating a method of processing related data when a connection between any one mobile terminal and another mobile terminal is terminated.
Figure 12B:
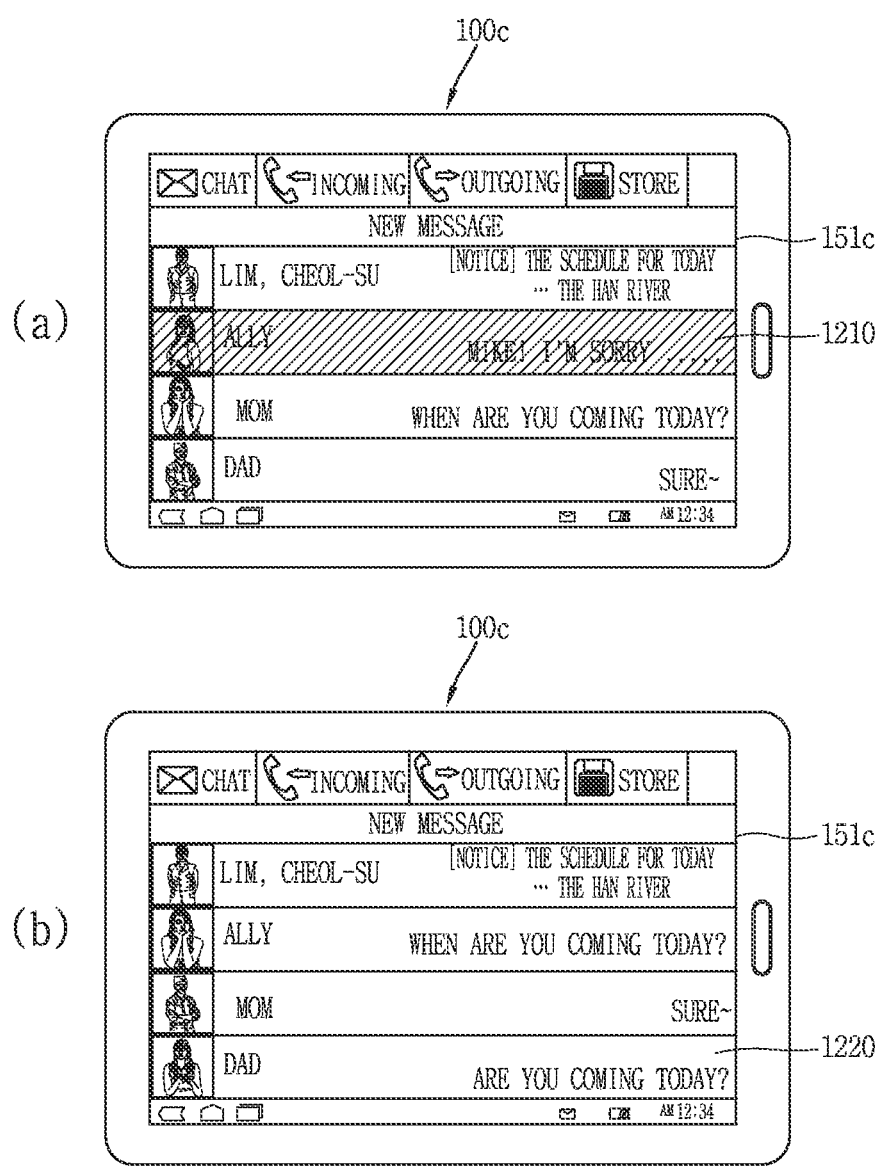

Next, a method of processing associated data when a call of the share terminal is terminated or a connection between the share terminal and the mobile terminal is terminated will be described in more detail below with reference to the accompanying drawings. FIGS. 12A and 12B are conceptual views illustrating a method of processing related data when a connection between any one mobile terminal and another mobile terminal is terminated.

A network connection between the share terminal 100a and mobile terminal 100c may be terminated based on the termination of a call between the share terminal 100a and mobile terminal 100c or the user's request. In addition, when a network connection between the share terminal 100a and the mobile terminal 100c is terminated as described above, the controller 180 of the mobile terminal 100c may delete or continuously store data corresponding to an event signal or event information received at the share terminal 100a.

For example, as illustrated in FIG. 12A(a), when a network connection between the share terminal 100a and the mobile terminal 100c is terminated, the controller of the mobile terminal 100c may perform the processing of data corresponding to an event signal or event information received at the share terminal 100a based on the user's selection.

Thus, the user of the mobile terminal 100c can select whether to continuously store or delete data corresponding to an event signal or event information received at the share terminal 100a on the mobile terminal 100c. For example, a history including information corresponding to the received event signal is processed may be displayed to be distinguished from a history for which the other information is processed. Furthermore, in this instance, the history for which information corresponding to the event signal is processed may be controlled by the user's input to the mobile terminal as well as a control command transmitted from the share terminal.

The controller of the mobile terminal 100c may determine whether or not to process the data (for example, history information) based on the user's selection as illustrated in FIG. 12A(b). A plurality of processing methods of history information may also be possible. A first method for processing history information includes deleting history information from the mobile terminal 100c. A second method for processing history information includes deleting history information from the mobile terminal 100c, and transmitting the history information to the share terminal 100a or cloud server (not shown), thereby allowing the user of the share terminal 100a to use the history information.

Further, a third method for processing history information includes storing history information in the mobile terminal 100c. A fourth method for processing history information includes storing history information, and transmitting the history information to the share terminal 100a or cloud server, thereby allowing the user of the share terminal 100a to use the history information.

In addition, the mobile terminal 100c may automatically transmit history information to a cloud server even when an item for selecting history information with a cloud server is not selected as described above. Further, when a method for deleting history information is selected, an embodiment of processing event data on the mobile terminal 100c will be described with reference to FIGS. 12B(a) and 1213(b).

For example, as illustrated in FIG. 128(a), the controller of the mobile terminal 100c may display data associated with the share terminal 100a to be distinguished from the other data (refer to reference numeral 1210). In this instance, when a method for deleting history information is selected, the controller of the mobile terminal 100c will no longer display a text message item 1210 corresponding to data 834 associated with the share terminal 100a as illustrated in FIG. 128(b).

Accordingly, instead of the text message item 1210 corresponding to data associated with the share terminal 100a, another text message item 1220 that has been stored in the mobile terminal 100c may be displayed on the text message item. Thus, the mobile terminal 100c can provide a plurality of methods for processing history information to process history information in various ways according to the user's preference. Furthermore, the processing of the history information may be performed on the share terminal 100a. When a wireless connection to the other terminal is released, the share terminal 100a may be formed to receive a control command associated with the processing of information that has been displayed on the mobile terminal 100c. In this instance, when the share terminal 100a has a plurality of IDs, the share terminal 100a may be formed to receive a control command associated with the processing of information corresponding to the identified ID that has been displayed on the mobile terminal 100c.

In addition, a mobile terminal and a control method thereof according to an embodiment of the present invention may receive an event signal from any one mobile terminal based on a call being received from the any one mobile terminal, and display information associated with the any one mobile terminal based on the received event signal. Accordingly, the user can use information associated with the any one mobile terminal while performing a phone call with the any one mobile terminal.

Therefore, a mobile terminal and a control method thereof according to an embodiment of the present invention can solve a problem in which the display unit of the any one mobile terminal cannot be used while a phone call function is performed in the mobile terminal.

Also, according to a mobile terminal and a control method thereof according to an embodiment of the present invention, when a call signal is received or a call is connected in correspondence to the received call signal, event information corresponding to the received call may be transmitted to display screen information associated with the mobile terminal according to an embodiment of the present invention on a mobile terminal located at a near distance.

Accordingly, the user can continuously use information associated with the mobile terminal according to an embodiment of the present invention through a mobile terminal located at a near distance even when the display unit cannot be used while a phone call function is performed in the mobile terminal according to an embodiment of the present invention.

Moreover, when a plurality of identification IDs (for example, Tell URIs (Uniform Resource Identifiers)) are designated for the mobile terminal according to an embodiment of the present invention, it may be determined that the received call corresponds to which one of the identification IDs, and an event signal corresponding to the determined identification ID may be transmitted to a mobile terminal located at a near distance to display screen information corresponding to the determined identification ID on the mobile terminal located as a near distance.

In addition, according to an embodiment disclosed in the present invention, the foregoing method may be implemented as codes readable by a processor on a medium written by a program. Examples of the processor-readable media may include ROM, RAM. CD-ROM, magnetic tape, floppy disk, and optical data storage device, and the like, and also include a device implemented, for example, transmission via the Internet).

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
a display unit configured to display an execution screen of an application;
a wireless communication unit configured to receive a call signal from at least one other terminal; and
a controller configured to:
display call related information on the display unit in response to receiving the call signal, wherein the execution screen of the application is no longer displayed on the display unit when the call related information is displayed; and
transmit information related to the execution screen of the application to an external terminal if a call connection corresponding to the call signal is successfully established between the mobile terminal and said at least one other terminal such that the execution screen of the application, displayed on the mobile terminal before the call signal, is displayed on a display unit of the external terminal.

2. The mobile terminal of claim 1, wherein said call signal corresponds to at least one of a first call ID and a second call ID of the mobile terminal, and
wherein information displayed on the external terminal is a corresponding graphic user interface preset for the corresponding first or second call ID.

3. The mobile terminal of claim 2, wherein if the received call signal is for the first call ID, the controller is further configured to control the external terminal to display a first graphic user interface preset for the first call ID, and if the received call signal is for the second call ID, the controller is further configured to control the external terminal to display a second graphic user interface for the second call ID.

4. The mobile terminal of claim 3, wherein the first call ID is a personal call ID and the second call ID is a business call ID.

5. The mobile terminal of claim 1, wherein the first and second call IDs correspond to first and second phone numbers, respectively, or correspond to first and second subscriber identity modules (SIMS), respectively.

6. The mobile terminal of claim 1, wherein the controller is further configured to control the external terminal to display the corresponding first or second call IDS on the display unit of the external terminal.

7. The mobile terminal of claim 1, wherein the controller is further configured to control the external terminal to display a list of applications on the display unit of the external terminal corresponding to one or more applications executing on the mobile terminal before the call signal was received.

8. The mobile terminal of claim 1, wherein the controller is further configured to control the external terminal to display information related to the corresponding first or second call ID on a first portion of the display unit of the external terminal and display information displayed on the external terminal before the call signal was received on a second portion of the display unit of the external terminal.

9. The mobile terminal of claim 8, wherein the controller is further configured to control the external terminal to display the execution screen displayed on the mobile terminal before the call signal was received on the display unit in a third portion of the display unit of the external terminal.

10. The mobile terminal of claim 1, wherein if an event is received while the call connection is maintained, information related to the event is transmitted to the external terminal.

11. The mobile terminal of claim 10, wherein the event is an incoming message.

12. The mobile terminal of claim 11, wherein the controller is further configured to control the external terminal to display a list of options for responding to the event on the display unit of the external terminal.

13. A mobile terminal, comprising:
a wireless communication unit configured to receive a call signal from at least one other terminal, said call signal corresponding to at least one of a first call ID and a second call ID of the mobile terminal; and
a controller configured to:
receive an event on the mobile terminal after the call signal is received;
transmit an event signal to an external terminal wirelessly connected with the mobile terminal using the corresponding first or second call ID to respond to the received event;
control the external terminal to display information on a display unit of the external terminal based on the event signal;
display call related information on a display unit of the mobile terminal when the signal is received; and
control the external terminal to display screen information displayed on the mobile terminal before the call signal was received on the display unit of the external terminal,
wherein the information displayed on the mobile terminal before the call signal was received corresponds to at least one application executed on the mobile terminal before the call signal was received, and
wherein the at least one application includes a plurality of applications, and the controller is further configured to control the external terminal to display a list of applications on the display unit of the external terminal corresponding to the plurality of applications executing on the mobile terminal before the call signal was received.

* * * * *